US008306975B1

(12) United States Patent
Eldering

(10) Patent No.: US 8,306,975 B1
(45) Date of Patent: Nov. 6, 2012

(54) EXPANDED INTEREST RECOMMENDATION ENGINE AND VARIABLE PERSONALIZATION

(75) Inventor: Charles A. Eldering, Furlong, PA (US)

(73) Assignee: Worldwide Creative Techniques, Inc. (VG)

( * ) Notice: Subject to any disclaimer, the term of this patent is extended or adjusted under 35 U.S.C. 154(b) by 140 days.

(21) Appl. No.: 11/410,433

(22) Filed: Apr. 25, 2006

Related U.S. Application Data

(63) Continuation of application No. 11/370,323, filed on Mar. 8, 2006, now abandoned.

(60) Provisional application No. 60/659,650, filed on Mar. 8, 2005.

(51) Int. Cl.
*G06F 7/00* (2006.01)

(52) U.S. Cl. ........................................ 707/732; 707/749

(58) Field of Classification Search .................. 707/1, 3, 707/5, 732
See application file for complete search history.

(56) References Cited

U.S. PATENT DOCUMENTS

| | | | |
|---|---|---|---|
| 5,201,010 | A | 4/1993 | Deaton |
| 5,319,455 | A | 6/1994 | Hoarty |
| 5,351,075 | A | 9/1994 | Herz |
| 5,446,919 | A | 8/1995 | Wilkins |
| 5,537,586 | A | 7/1996 | Amram |
| 5,559,549 | A | 9/1996 | Hendricks |
| 5,604,542 | A | 2/1997 | Dedrick |
| 5,621,812 | A | 4/1997 | Deaton |
| 5,644,723 | A | 7/1997 | Deaton |
| 5,649,114 | A | 7/1997 | Deaton |
| 5,652,615 | A | 7/1997 | Bryant |
| 5,704,017 | A | 12/1997 | Heckerman |
| 5,724,521 | A | 3/1998 | Dedrick |
| 5,754,938 | A | 5/1998 | Herz |
| 5,754,939 | A | 5/1998 | Herz |
| 5,758,257 | A | 5/1998 | Herz |
| 5,774,170 | A | 6/1998 | Hite |
| 5,796,952 | A | 8/1998 | Davis |
| 5,867,799 | A | 2/1999 | Lang |
| 5,918,014 | A | 6/1999 | Robinson |
| 5,974,396 | A | 10/1999 | Anderson |
| 6,009,410 | A | 12/1999 | LeMole |

(Continued)

FOREIGN PATENT DOCUMENTS

| | | |
|---|---|---|
| CA | 2323166 | 4/2001 |

(Continued)

OTHER PUBLICATIONS

Anderson, Michelle, et al, "*RACOFI: A Rule-applying Collaborative Filtering System*", Proc IEEE?WID COLA'03, Halifax, Canada, Oct. 2003,11 pgs.

(Continued)

*Primary Examiner* — Amy Ng
(74) *Attorney, Agent, or Firm* — Carlineo, Spicer & Kee, LLC

(57) ABSTRACT

An electronic processing system for generating a partially personalized electronic data display that contains a combination of recommended and expanded interest items. The system retrieves a first set of data describing an area of user interests and retrieves a first set of items corresponding to the area of user interests. The system retrieves a second set of items in an expanded area of interest that is not directly included in the area of user interest. The first and second set of items are combined and the combined set of recommended and expanded interest items is displayed.

31 Claims, 21 Drawing Sheets

U.S. PATENT DOCUMENTS

| | | | | |
|---|---|---|---|---|
| 6,026,370 | A | 2/2000 | Jermyn | |
| 6,029,195 | A | 2/2000 | Herz | |
| 6,088,722 | A | 7/2000 | Herz | |
| 6,134,532 | A | 10/2000 | Lazarus | |
| 6,160,989 | A | 12/2000 | Hendricks | |
| 6,177,931 | B1 | 1/2001 | Alexander | |
| 6,216,129 | B1 | 4/2001 | Eldering | |
| 6,266,649 | B1 | 7/2001 | Linden | |
| 6,292,786 | B1 | 9/2001 | Deaton | |
| 6,298,348 | B1 | 10/2001 | Eldering | |
| 6,321,221 | B1 | 11/2001 | Bieganski | |
| 6,326,962 | B1 * | 12/2001 | Szabo | 715/762 |
| 6,327,574 | B1 | 12/2001 | Kramer | |
| 6,334,108 | B1 | 12/2001 | Deaton | |
| 6,334,127 | B1 * | 12/2001 | Bieganski et al. | 707/5 |
| 6,412,012 | B1 | 6/2002 | Bieganski | |
| 6,438,579 | B1 * | 8/2002 | Hosken | 709/203 |
| 6,457,010 | B1 | 9/2002 | Eldering | |
| 6,460,036 | B1 | 10/2002 | Herz | |
| 6,463,585 | B1 | 10/2002 | Hendricks | |
| 6,505,169 | B1 | 1/2003 | Bhagavath | |
| 6,516,302 | B1 | 2/2003 | Deaton | |
| 6,560,578 | B2 | 5/2003 | Eldering | |
| 6,571,279 | B1 | 5/2003 | Herz | |
| 6,643,696 | B2 | 11/2003 | Davis | |
| 6,766,362 | B1 | 7/2004 | Miyasaka | |
| 6,820,062 | B1 | 11/2004 | Gupta | |
| 6,845,273 | B1 | 1/2005 | Taylor | |
| 6,850,260 | B1 | 2/2005 | Taylor | |
| 6,912,571 | B1 | 6/2005 | Serena | |
| 7,062,510 | B1 | 6/2006 | Eldering | |
| 7,185,001 | B1 * | 2/2007 | Burdick et al. | 707/3 |
| 2001/0021914 | A1 * | 9/2001 | Jacobi et al. | 705/8 |
| 2002/0095676 | A1 | 7/2002 | Knee | |
| 2002/0103692 | A1 * | 8/2002 | Rosenberg et al. | 705/10 |
| 2002/0152245 | A1 | 10/2002 | McCaskey | |
| 2002/0156678 | A1 | 10/2002 | Adams | |
| 2002/0184107 | A1 * | 12/2002 | Tsuda et al. | 705/26 |
| 2002/0188635 | A1 | 12/2002 | Larson | |
| 2002/0194058 | A1 | 12/2002 | Eldering | |
| 2003/0004810 | A1 | 1/2003 | Eldering | |
| 2003/0020744 | A1 | 1/2003 | Ellis | |
| 2003/0088872 | A1 | 5/2003 | Maissel | |
| 2004/0199874 | A1 | 10/2004 | Larson | |
| 2004/0236736 | A1 * | 11/2004 | Whitman et al. | 707/3 |
| 2004/0267556 | A1 | 12/2004 | Larson | |
| 2005/0216434 | A1 * | 9/2005 | Haveliwala et al. | 707/1 |
| 2006/0074883 | A1 * | 4/2006 | Teevan et al. | 707/3 |
| 2006/0129534 | A1 * | 6/2006 | Jones et al. | 707/3 |
| 2009/0157605 | A1 * | 6/2009 | Kelly | 707/3 |

FOREIGN PATENT DOCUMENTS

| | | | |
|---|---|---|---|
| WO | WO 9821877 | A2 | 5/1998 |
| WO | WO 9901984 | A1 | 1/1999 |
| WO | WO 9904561 | A1 | 1/1999 |
| WO | WO 0013434 | A2 | 3/2000 |
| WO | WO 0033224 | A1 | 6/2000 |

OTHER PUBLICATIONS

Web pages, “One Workflow, Multiple Solutions”, www.active-paper.com/ap_platform.html, Feb. 13, 2005, 3 pgs.

Raskutti, Bhavani et al., “*Acquiring Customer Preferences for Information Filtering: a Heuristic-Statistical Approach*”, Proceedings of the 5th Int'l Conference on User Modeling, Kaluna-Kona, HI, USA, Jan. 2-5, 1996, 3 pgs.

Zaslow, Jeffrey, “*If TiVo Thinks you are Gay, Here's how to set it straight*”, The Wall Street Journal Online, Nov. 26, 2002, 4 pgs.

Linden, Greg, et al, “*Amazon.com Recommendations, Item-to-Item Collaborative Filtering*”, IEEE Computer Society, IIEEE Internet Computing, 1089-7801/03, Jan.-Feb. 2003, 5 pgs.

Ramos, Vitorino, et al, “*Evolving a Stigmergic Self-Organized Datamining*”, 4th Int. Conf. on Intelligent Systems, Design and Applications, Budapest, Hungary, ISBN 963-7154-30-2, Aug. 26-28, 2004, 10 pgs.

* cited by examiner

| Recommendation Engine Type | Basis For Recommendation | Mapping to $r$ |
|---|---|---|
| Non-Personalized | Recommendations developed based on the number of recommendations from other users for items in that space. | Highly recommended items have a high degree of relevancy (low $r$) while less recommended items have a lower degree of relevancy (high $r$) |
| Item-to-Item | Recommendations developed based on relationships between items already consumed or in which the user has shown interest and new items having similar attributes | Items having many similar attributes to those items known to be of high interest to the consumer are highly relevant, while those having fewer similar attributes are less relevant |
| Attribute Based | Recommendations developed based on attributes (syntactic properties or descriptive content) of available items and user attributes | Items having many similar attributes to attributes users indicate are important have high relevancy, items having less matching attributes are less relevant |
| Content-based | Recommendations based on features or attributes of items used in combination with rating/feedback of attributes obtained from the consumer | Items with many preferred (as indicated through rating/feedback) features or attributes are deemed more relevant, items with fewer preferred features or attributes are deemed less relevant |
| Collaborative Filtering | Recommendations based on items that similar users have rated highly, or for which high numbers of similar users have consumed | Items which many similar users have rated highly or consumed are highly relevant, items which somewhat similar (or fewer highly similar) users have rated highly or consumed are rated less relevant |

Table 1

FIG. 6

| POSITION | TYPE OF STORY |
|---|---|
| 1 | INTEREST BASED/RECOMMENDED STORY |
| 2 | EXPANDED INTEREST STORY |
| 3 | INTEREST BASED/RECOMMENDED STORY |
| 4 | INTEREST BASED/RECOMMENDED |
| 5 | EXPANDED INTEREST STORY |
| 6 | INTEREST BASED AD |
| 7 | INTEREST BASED AD |
| 8 | EXPANDED INTERESTED AD |

*FIG. 18*

EXPANDED INTEREST RECOMMENDATION ENGINE AND VARIABLE PERSONALIZATION

CROSS REFERENCE TO RELATED APPLICATIONS

This application is a continuation of U.S. patent application Ser. No. 11/370,323 filed Mar. 8, 2006 now abandoned, entitled "Expanded Interest Recommendation Engine and Variable Personalization,", which claims the benefit of U.S. Provisional Patent Application No. 60/659,650 filed Mar. 8, 2005, entitled "Expanded Interest Recommendation Engine and Variable Personalization," the entire disclosures of which are herein incorporated by reference.

BACKGROUND OF THE INVENTION

Advances in electronic media and commerce have had a significant impact on consumers by providing them with rapid access to content and the ability to find and purchase a multitude of items without having to travel to a store. Electronic media and commerce are competing heavily with traditional forms of content delivery (e.g. print and broadcast content) and "bricks and mortar" stores. A consumer can receive a significant portion of their information completely from electronic means, including electronic newspapers, e-mail, web sites, digitally stored video programming, and other electronic methods of delivery. As applied to shopping, consumers can search for, locate and purchase a tremendous number of items ranging from drugstore type items to large items, such as furniture and appliances, over the Internet.

As electronic access to information and goods has increased, recommendation engines have been developed that provide suggestions for both information and goods to consumers. These recommendation engines have been created both because electronic media and commerce provide overwhelming opportunities to consumers and because electronic media is not viewed the same as printed media. Electronic access provides more choices for information or goods than printed media (e.g. newspapers and catalogs) but does generally not provide for as rapid access to content since each page in the electronic medium must be loaded separately. To date, printed media offers faster access to content via manual page turning than electronic media offers via page loading.

As electronic media evolves and improvements are made to displays and servers, and as bandwidth to the consumer increases, the gap between print media and electronic media will begin to close. Electronic media will begin to provide a more print-like experience as consumers are able to rapidly access materials that appear to be printed on displays that may have form factors more similar to books and newspapers. Technologies such as flexible displays, tablet computers, and "smart ink" systems that appear as printed materials but which can be written to as displays have the potential to blur the line between printed and electronic media.

Printed media and electronic media are currently at opposite extremes with regards to the degree of personalization. Printed media is typically uniform: newspapers and catalogs are generally identical for all consumers. Electronic media is typically highly personalized, with the media (portal, web pages) being highly customized based on the user's preferences.

With respect to generalized or non-personalized media such as print newspapers, an individual consumer typically expects to see the same content as other consumers so that they can feel that they are receiving the same information as other consumers. As an example, a businessperson expects to see the same news items in the newspaper as other businesspeople, and would potentially be displeased by finding out that their newspaper did not contain articles that another businessperson saw. The same consumer may find personalization of a leisure magazine or catalog acceptable, however, and may prefer to have only personalized information in those publications (print or electronic). The degree of personalization may vary depending on the individual, the content, and the type of publication.

As the gap between printed media and electronic media closes, and as electronic media begins to appear closer to printed media, the degree of personalization of the content will need to be carefully considered for each application and consumer. Recommendation engines have been partially effective in sorting through the myriad of electronic choices in many applications, but are inadequate in terms of presenting the consumer with choices that are personalized enough to avoid wasting their time, yet are not overly filtered, robbing them of the shared experience printed media currently provides. What is required is a recommendation engine that allows for a sufficient degree of personalization for the specific individual and application.

Recommendation engines also suffer from the fact that they can frequently be led astray and may incorrectly perceive a like or dislike of an individual, resulting in numerous incorrect and potentially annoying recommendations. Once the recommendation engine incorrectly perceives something about the consumer, it can be difficult to escape or correct the particular characterization the system has made. What is required is a recommendation engine that can relearn the interests of the consumer without being cleared.

BRIEF SUMMARY OF THE INVENTION

The present method and system provides for the selection of items not only from a region of interest specific to the consumer or user, as would be performed by a recommendation engine, but from an expanded or extended region of interest. The expanded region of interest represents items that might be of interest to the consumer/user although they have not been initially chosen by the recommendation engine. The expanded region of interest does not include areas of disinterest, with that area representing items that are clearly not of interest (and potentially annoying or offensive) to the consumer. By presenting items from the expanded region of interest to the consumer the electronic system offers the consumer items outside of its known scope and also gives the consumer the possibility to interact (through selection of the item from the expanded region of interest) with the system in a way that allows for further learning of the consumers' interests or potential interests.

One embodiment of the present system and method functions as a variable personalization system. The variable personalization system may interact with or receive results from one of many possible recommendation engines. The variable personalization system takes recommendations from a recommender and adds some additional items from a region of expanded interest, depending on the desired degree of personalization.

In one embodiment the items from the expanded region of interest are displayed simultaneously with the items from the region of interest, and the consumer is not aware that items potentially outside of their present range of preferences have been presented.

An application of the present method and system is in the area of electronic publications such as electronic newspapers and catalogs. In these embodiments news articles or offers for sale are selected based on information about the user and items selected by a recommendation engine. Items from outside of the region of interest but within an expanded region of interest are determined by an expanded interest recommendation engine. The items from the expanded region of interest are combined with items determined from the user preferences and recommendation engine and published to the consumer. These items may be news articles, advertisements, or offers for sale. In one embodiment, an automated layout system is used to combine the region of interest items with items from outside the region of interest to produce a unified display that appears as an integrated publication.

Another application of the present system and method is the ability to re-learn or more appropriately learn a consumer's preferences. By presenting items from an expanded region of interest, the system learns new preferences of the consumer, or in the case of having previously presented erroneous items, learns of new preferences and can more readily discount (e.g. though weighing factors) previous preferences.

The present method and system can also be used to vary the degree of personalization of electronically published materials, or to create indices or bookmarks that have varying degrees of personalization. In one embodiment, the degree of personalization is varied by changing the region of interest. By expanding the region of interest infinitely the system reverts to the generalized publication or index with no personalization. Decreasing the region of interest in all categories or areas or in particular areas or categories results in a higher degree of personalization. In this way a consumer that does not want any personalization, or only accepts personalization in particular categories, can access or receive an electronic publication that is the same as that received by other individuals except for a limited degree of personalization that is applied overall to the publication or only to specific areas.

In one embodiment the published material remains generalized, but the indices are personalized such that the individual receives the same printed document as other individuals, but has a customized index or set of bookmarks that allows them to rapidly access the content that is believed to be of interest to them. Both a region of interest and an expanded region of interest can be applied to the personalized bookmarks and indices.

In one embodiment of the invention a computer based method for generating a partially personalized electronic data output containing a combination of recommended and expanded interest items includes retrieving a first set of data that describes the area of the user's interests. A first set of items corresponding to the area of a user's interests is retrieved and a second set of items in an area of expanded interest that is not directly included in the area of user interests is retrieved. The first set of items and the second set of items are combined such that the combined set of recommended and expanded interest items is output.

In one embodiment of the above computer based method, the items are not only combined, they are interspersed. In one embodiment the interspersing is realized through a two dimensional layout. This layout may resemble that of a printed document. In one embodiment of the present invention the area of interest and the area of expanded interest may be described in terms of radius. Further, the radius of the area of expanded interest may be altered by the user. In one embodiment the area of expanded interest may exclude an area of disinterest.

In another embodiment of the above computer based method, the ratio of the first set of items to the second set of items may be derived from user input. In one embodiment the first set of items may contain informational content. That informational content may be in the form of a news story. In one embodiment the first set of items may contain advertisements and in another it may contain items for sale.

In one embodiment of the invention a computer based method for redirecting a recommendation engine includes presenting the user with one or more items of expanded interest. A user input corresponding to the selection of one or more expanded interest items is received. The recommendation engine is modified based on the user selection of one or more expanded interest items. In one embodiment of the computer based method for redirecting a recommendation engine, the modification of the function of the recommendation engine is realized through the modification of user preferences.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the Drawings:

FIG. 6 illustrates a table for mapping recommendation engines to radius;

FIG. 18 illustrates the use of areas of interest and expanded areas of interest to create a "news queue" for subsequent layout and presentation to the user;

DETAILED DESCRIPTION OF THE INVENTION

Figure 1:
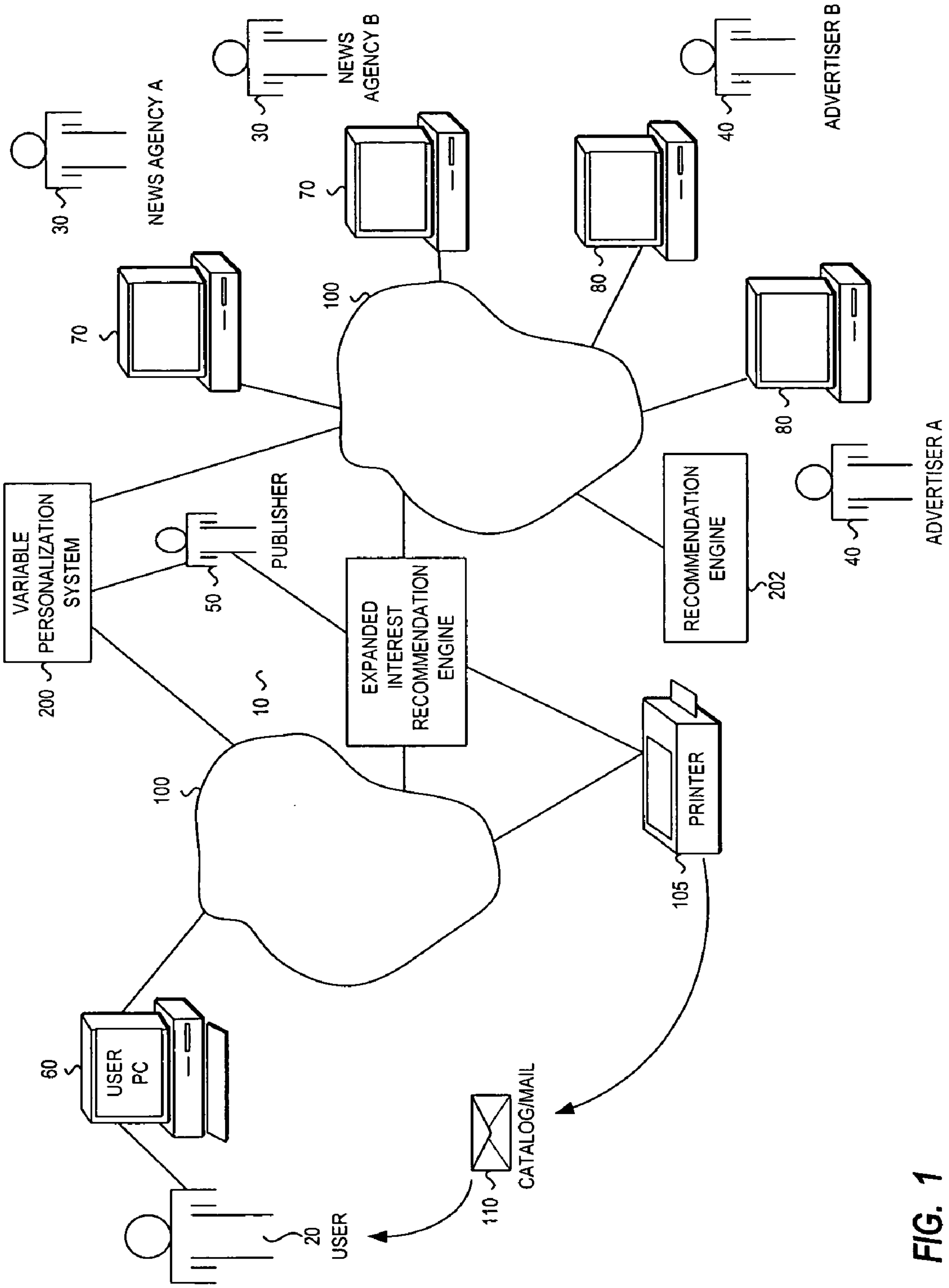
FIG. 1 illustrates the expanded interest recommendation engine in accordance with the present method and system, in use on an information exchange network between a user, publisher, news agency, and advertiser.

Certain terminology is used herein for convenience only and is not to be taken as a limitation on the present invention. In the drawings, the same reference letters are employed for designating the same elements throughout the several figures.

Figure 2:
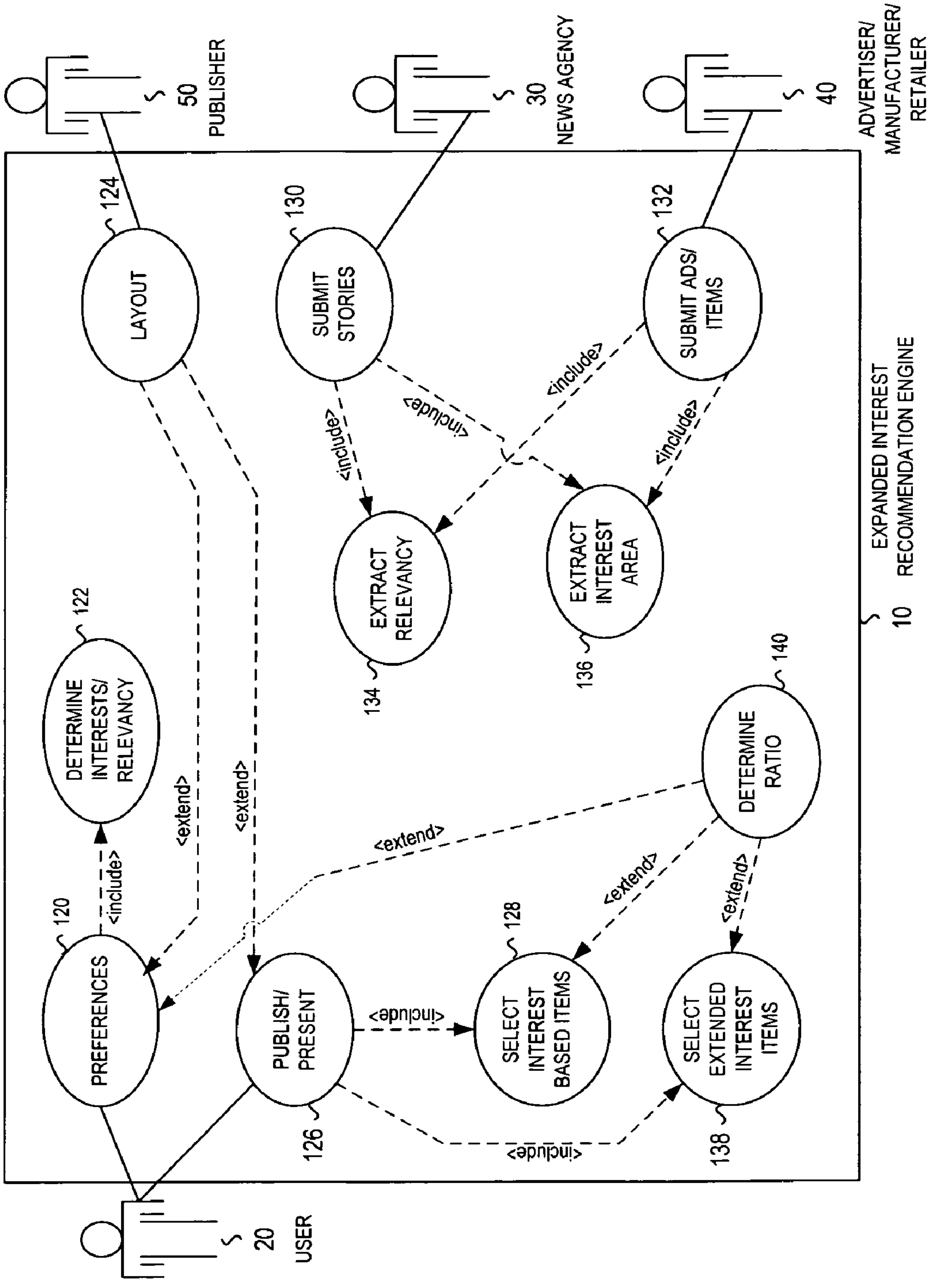
FIG. 2 illustrates a use-case diagram for the expanded interest recommendation engine in accordance with the present system and method.
Figure 3:
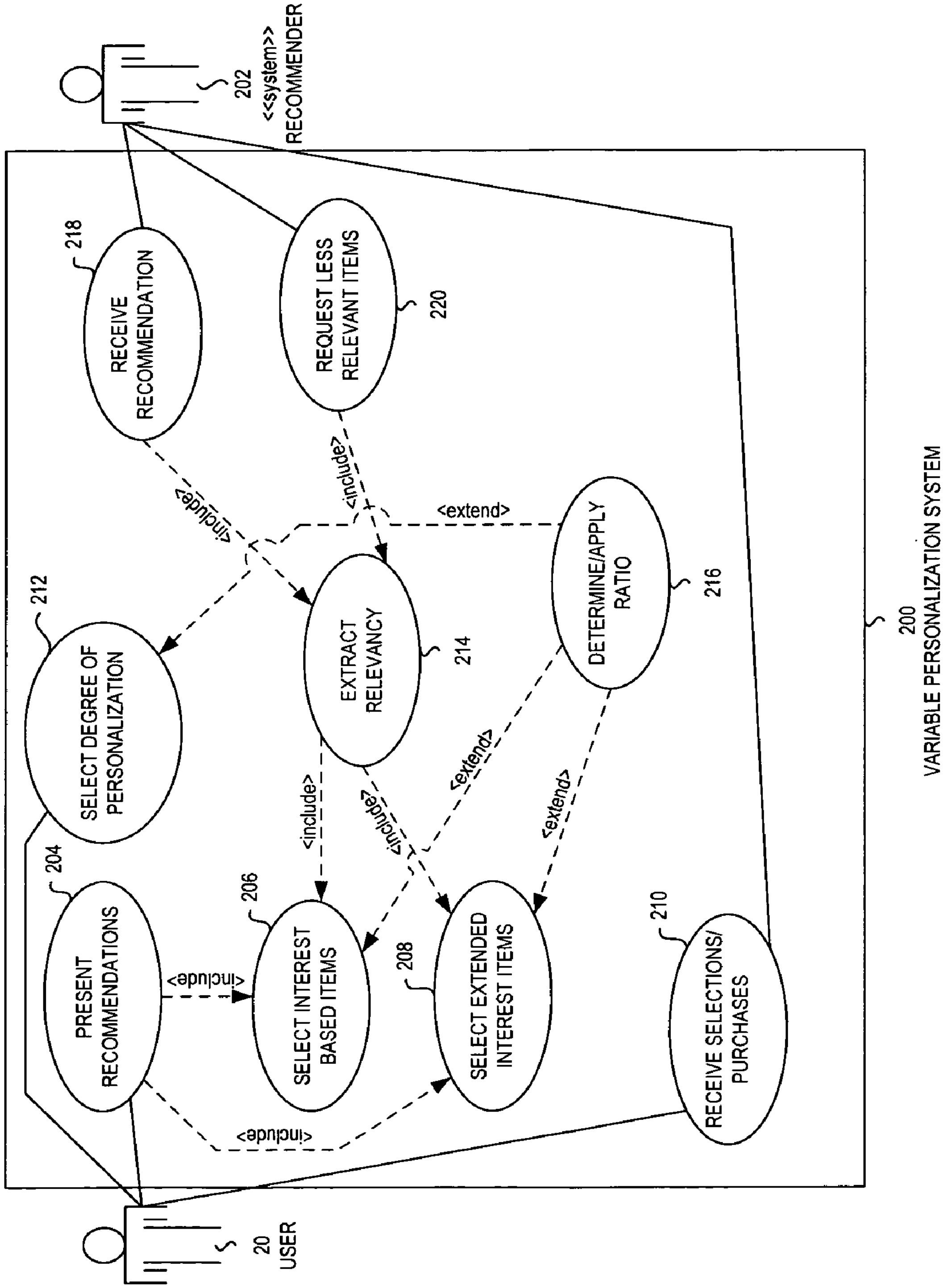
FIG. 3 illustrates a use-case diagram for the variable personalization system in accordance with the present system and method.

FIGS. 2 and 3 illustrate a Unified Modeling Language ("UML") use-case diagram for an expanded recommendation engine and variable personalization engine and associated systems and actors in accordance with the present method and system. UML can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the present method and system, but do not constrain its implementation to any particular hardware or software embodiments. Unless otherwise noted, the notation used with respect to the UML diagrams contained herein is consistent with the UML 2.0 specification or variants thereof and is understood by those skilled in the art.

Referring to FIG. 1, an expanded interest recommendation engine 10 in accordance with the present method and system offers a user 20 content provided by a variety of content providers, including, but not limited to news agencies 30 and advertisers 40. Other content providers may include, but are not limited to, those who provide items for sale, those who provide services, or any other providers generally known to those skilled in the art. The expanded interest recommendation engine 10 provides user 20 content that he or she would have been exposed to through a traditional recommendation engine, but also provides user 20 with content of expanded interest. User 20 may find that because the expanded interest recommendation engine 10 may bring user 20 items of expanded interest, as well as modify user interest preferences based on the reaction to these items of expanded interest, that the expanded interest recommendation engine 10 is far preferable to present recommendation engines. Through the subtle integration of items of expanded interest, user 20 may find the results generated to be preferable and may feel as though the expanded interest recommendation search engine 10, is anticipating the evolution of the preferences of the user 20.

The expanded interest recommendation engine 10 functions by first retrieving user identifying information from a user computer 60 that has been provided by user 20, over a network 100. The network 100 may be any network or system generally known in the art, including the Internet, LAN, or other computer-based communication or information sharing system. This identifying information may include but is not limited to, user preferences, user interests, and user location. This information may have been entered by user 20, may be collected by monitoring user actions, or may be obtained from some other source. Methods of data collection will be known to those skilled in the art and may be employed here.

News agency computers 70 and advertiser computers 80 provide content to the expanded interest recommendation engine 10. A publisher 50 preferably provides layout information to expanded interest recommendation engine 10. This information in addition to user identifying information and news and advertising content is processed by the expanded interest recommendation engine 10. The expanded interest recommendation engine 10 preferably generates an output to the user computer 60, through which user 20 can access the results. Alternatively, the expanded interest recommendation engine 10 may generate through a printer 105, customized physical documents. These documents may be in the form of catalogs/mail 110 and may be sent to user 20 as an alternative form of interface. Similar to an electronic result, a personalized catalog or mailing that additionally contains items of expanded interest will not only targets current user buying interests, but additionally targets and discover possible unknown user interests. This may allow a marketer to expand the business received from a particular user because the marketer will know additional areas from which the consumer desires to purchase products.

Alternatively, news agency computers 70 and advertiser computers 80 provide content to the recommendation engine 202. Publisher 50 preferably provides layout information to variable personalization system 200. The variable personalization system 200 receives items of interest from the recommendation engine 202. The variable personalization system 200 requests items of expanded interest from the recommendation engine 202. The variable personalization system 200 preferably generates an output to the user computer 60, through which user 20 can access the results.

FIG. 2 illustrates a use case diagram for one possible embodiment for the expanded interest recommendation engine 10. User 20 provides preferences to the expanded interest recommendation engine 10 via the preferences use case 120. Preferences may be provided in a variety of ways, including retrieval from a traditional computer database, may be entered by user 20 at the time of use, or may be aggregated over time by mining of user 20 actions. The ways in which preferences are retrieved are not intended to be limited to those described above. Those skilled in the art will know of these and additional methods of obtaining user preferences.

In one embodiment the preferences use case 120 includes a determine interests/relevancy 122 use case. The determine interest/relevancy use case 122 may determine the interests of user 20 based on the preferences provided through the preferences use case 120. The interests of user 20 may be summarized in categories or interest areas such as news, sports, music, etc. The relevancy may refer to the level of relevancy desired by user 20 in the content presented by the expanded interest recommendation engine 10. In other words, user 20 may be only interested in content that has a high degree of relevancy to a particular category or area of interest.

In the present method and system, the determine interests/relevancy use case 122 may represent the areas of interest and the areas of expanded interest in terms of an area or region. These areas or regions may be characterized by various radii, each which may correspond to a particular interest area or category. Examples of these interest areas or categories may be, but are not limited to, sports, news, music, etc. The length of the radius related to each category or interest may relate to the user preferences. If a user desires to receive results even vaguely related to a particular category or interest area, then that radius will be larger. If a user desires to receive results closely related to a particular category or interest area, then that radius will be smaller.

Figure 8:
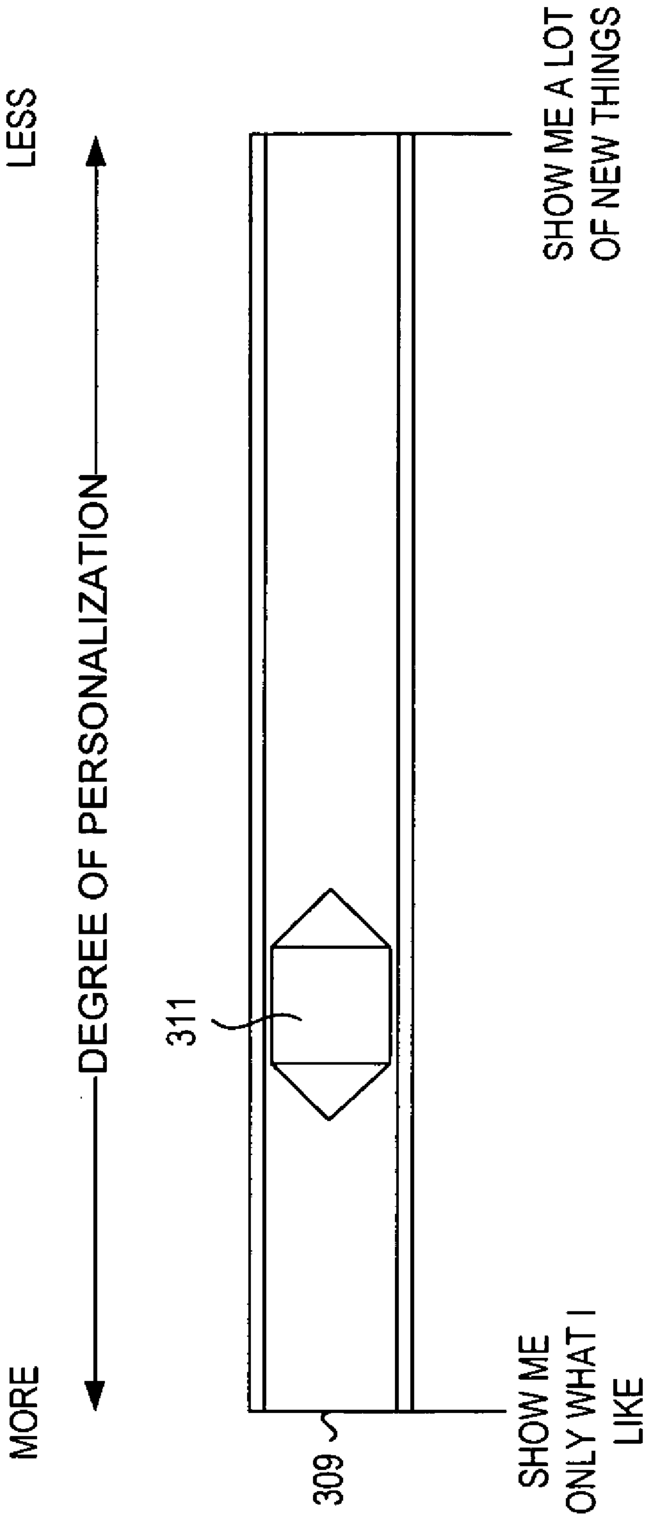
FIG. 8 represents one of many possible degree of personalization controls.

In one embodiment the user controls the radii related to the area of interest and the area of expanded interest. Preferably, the user controls the radii through the use of a slide bar 309 as illustrated in FIG. 8. As the user slides a bar 311 towards "show me a lot of new things," the degree of personalization decreases. This decrease is realized by increasing the radius related to the area of expanded interest. As the user slides the bar 311 the opposite way, the radius related to the area of expanded interest decreases. Alternatively, sliding the bar 311 controls the ratio between the radii; as the user slides the bar 311 towards less personalization, the ratio of the radius of the area of interest to the radius of the area of expanded interest decreases. Alternatively, the user may control the radii by other means, including but not limited to, a dial, entering a number for desired radius, entering a number for the ratio between the radii, and other means known to those skilled in the art.

In order for the expanded interest recommendation engine 10 to provide user 20 with content of interest and expanded interest, the content must be gathered by the expanded interest recommendation engine 10. For the expanded interest recommendation engine 10 to utilize content, it may be categorized into particular interest areas and the relevancy of that content may be determined. Generally, content may be provided by many sources, including, but not limited to news agencies 30 and advertisers 40. Other sources not shown may include, but are not limited to, manufacturers and retailers. News agencies 30 and advertisers 40 provide content to the expanded interest recommendation engine 10 by interacting with a submit stories use case 130 and a submit ads/items use case 132.

Figure 10:
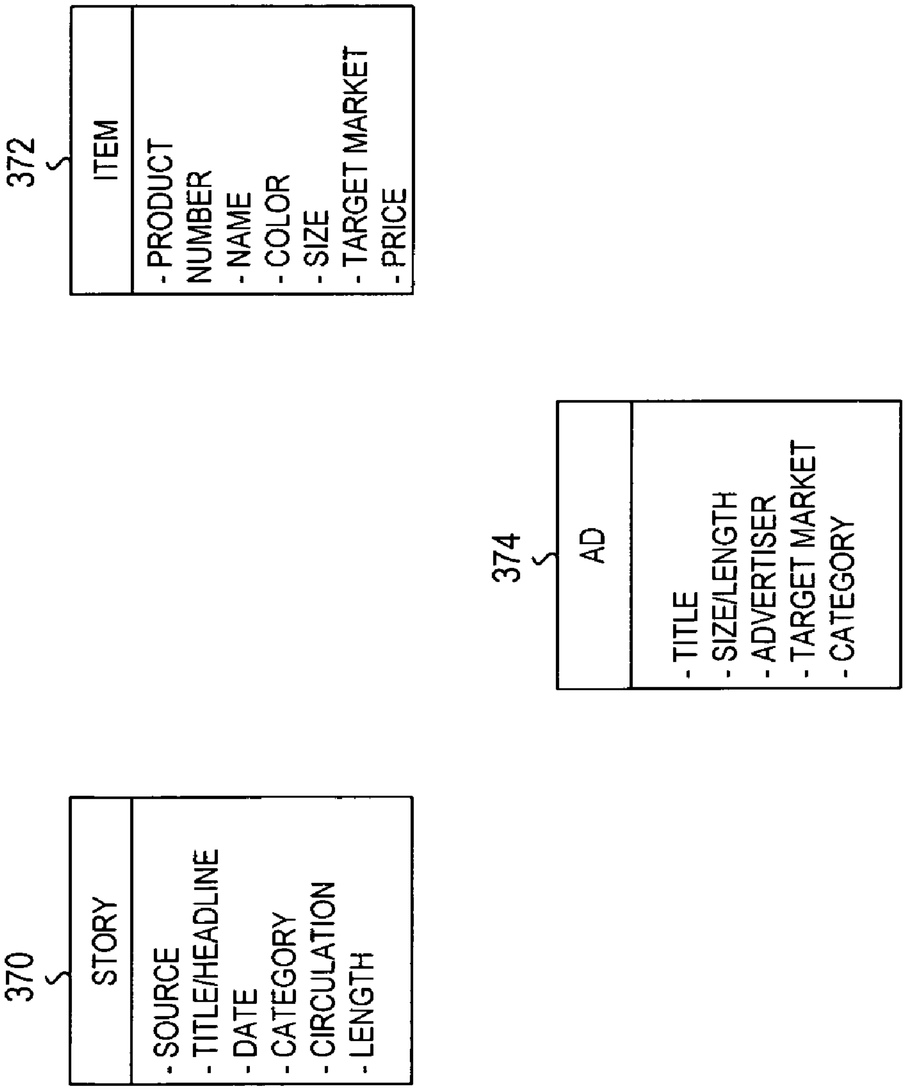
FIG. 10 illustrates a class diagram for content and the attributes related to that content.

Preferably the submit stories use case 130 and the submit ads/items use case 132 may include an extract relevancy use case 134 and extract interest area use case 136. The extract interest area use case 136 preferably analyzes various attributes of the content provided to determine what interest area the content will fall within. FIG. 10 discussed in greater detail below shows some possible attributes that may be analyzed. The extract relevancy use case 134 preferably determines the relevancy of a particular content item, either in its particular interest area or in general. Once content is provided and processed by extract relevancy use case 134 and extract interest area use case 136, it may be further utilized by expanded interest recommendation engine 10.

In addition to providing preferences to the expanded interest recommendation engine 10 through the preferences use case 120, user 20 may interact with the expanded interest recommendation engine 10 via a publish/present use case 126. The publish/present use case 126 calls for the expanded interest recommendation engine 10 to provide interest and expanded interest content to user 20 in an organized and accessible form. Examples of organized and accessible forms may include but are not limited to, portals for news, electronic catalogs, traditional newspaper layouts, and video. Publish/present use case 126 includes the select interest based items use case 128 and the select expanded interest items use case 138. Based on information provided by extract relevancy use case 134 and extract interest area use case 136, the select interest based items use case 128, selects items that will be of interest to user 20. Similarly, based on information provided by the extract relevancy use case 134 and the extract interest area use case 136, select expanded interest based items use case 138, selects items that will be of expanded interest to user 20.

The select interest based items use case 128 and the selected expanded interest based items use case 138 optionally utilize a determine ratio use case 140. The determine ratio use case 140 may serve to moderate how many interest items are selected as compared to the number of expanded interest items. Further, the preferences use case 120 preferably extends to include the determine ratio use case 140. Through the preferences use case 120 user 20 may specific the ratio of interest items to expanded interest items. The preference use case 120 may therefore extend to the determine ratio use case 140. In this way user 20 can control the degree of personalization of the results provided by the expanded interest recommendation engine 10. The specification of the degree of personalization may be performed by allowing the user to access directly the ratio of items or may be performed through a less direct method, for example, through a slide bar or other means as described in reference to FIG. 8. Further, the degree of personalization may be controlled by the results of passive mining of user interaction with expanded interest items. If user 20 shows great interest in expanded interest items, the expanded interest recommendation engine 10 may provide a greater ratio of expanded interest items. The ways in which the degree of personalization is controlled is not intended to be limited to those described above. Those skilled in the art will know of these and additional methods of controlling the degree of user personalization.

Publisher 50 may interact with the layout use case 124 in order to affect the way in which the display will be provided to user 20. The publish/present use case 126 may extend to include the layout use case 124. In this way the display that user 20 receives from the publish/present use case 126 may be controlled by publisher 50 through the layout use case 124. Publisher 50 may wish the layout to resemble a traditional newspaper such as the New York Times or Boston Globe. Alternatively, the publisher may want the layout to resemble an electronic publication with collapsible menus or categories. There are many possible layouts that will be known to those skilled in the art, and the suggestion of possibilities is not intended to limit the scope of the invention.

Publisher 50 may create a layout for the display such that, to user 20, the integration of interest items and expanded interest items may appear seamless. In this way the user is likely to receive the greatest benefit from the expanded interest recommendation engine 10, because, to user 20, it will seem as though publisher 50, not only provided items in the categories that user 20 outwardly expressed interest in, but also provided items in areas of expanded interest, much like a close friend would anticipate after years of knowing user 20.

User 20 through the preferences use case 120, may provide information on the layout he or she desires to the layout use case 124. In this way user 20 may specify whether he or she wants a page that resembles a traditional newspaper or more of an electronic news site or any other possible layout. Many other features of layout known to those skilled in the art may be specified by the user through the preferences use case 120 to the layout use case 124.

FIG. 3 shows a variable personalization system 200 in accordance with the method and system. User 20 may interact with a recommender 202 through the filter of variable personalization system 200 in order to be provided with more results of expanded interest. Recommender 202 may be an existing recommendation engine or any other system capable of making recommendations known to those skilled in the art. Interacting with recommender 202 through the variable personalization system 200 has the advantage of providing user 20 not just with interest based items, but additional expanded interest based items.

User 20 may interact with the variable personalization system 200 through a select degree of personalization use case 212. User 20 may select how personalized the results generated will be. If user 20 selects a high degree of personalization, the number of expanded interest items selected will be low compared to the number of interest items selected. Selecting a low degree of personalization will allow for more expanded interest items to be incorporated into the results. The degree of personalization may be given a default value that will be sufficient for user 20 to see a noticeable change in the scope of results provided. The select degree of personalization use case 212 may allow for direct or indirect control of the ratio similarly as to previously described with respect to FIGS. 2 and 8.

The variable personalization system 200 may, according to a present recommendations use case 204, present recommendations to user 20. The present recommendations use case 204 includes a select interest based items use case 206 and a select expanded interest based items use case 208 and enables the selection of items. The present recommendations use case 204 may present both items of interest and items of expanded interest.

Both the select interest based items use case 206 and the select expanded interest items use case 208 function in a very similar fashion. First, the select interest based items use case 206 may extend to a determine/apply ratio use case 216. Here the ratio of interest based items to expanded interest based items is determined according to the degree of personalization provided by the user. Alternatively, the determine/apply ratio use case 216 may determine the ratio of items depending on a preset ratio, on an analysis of the passive mining of user 20 interactions, or any other method known to those skilled in the art.

The number of interest based items to be retrieved is determined, the select interest based items use case 206 determines what items to select based on their relevancy. The included extract relevancy use case 214 may analyze whether a particular item is relevant as an interest based item.

Figure 5:
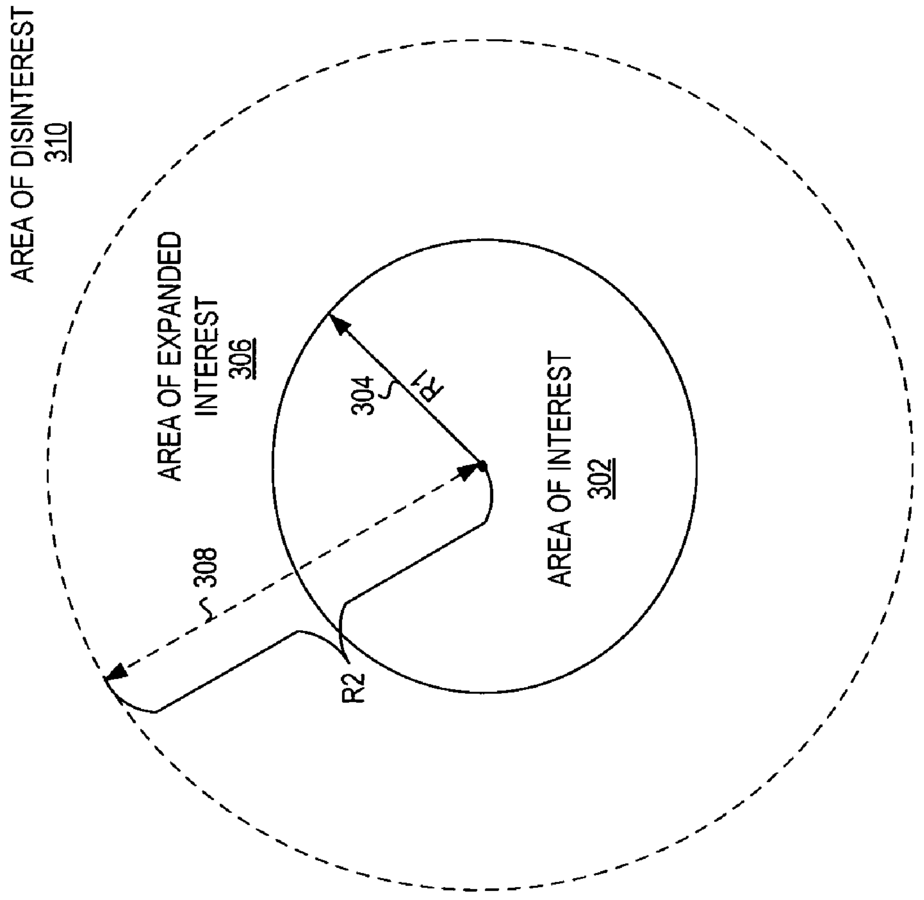
FIG. 5 illustrates the creation of an area of interest and an area of expanded interest.

The extract relevancy use case 214 includes receiving recommendations and requesting less relevant items from recommender 202. By including a receive recommendations use case 218 and a request less relevant items use case 220 a larger set of possible items is collected than normally would be from recommender 202. The select interest based items use case 206 selects items with a predetermined degree of relevancy or radius of relevancy through the included extract relevancy use case 214 from the items selected through the receive recommendations use case 218 and the request less relevant items use case 220 from recommender 202. Similarly, the select expanded interest based items use case 208 selects items with less relevancy (larger radius) through the included extract relevancy use case 214 from the items selected through receive recommendations use case 218 and request less relevant items use case 220 from recommender 202. FIG. 5 and its accompanying discussion further describes the use of a radial measure to determine whether a particular item should be classified as an interest item or an expanded interest item.

User 20, may interface with the variable personalization system 200 through a receive selections/purchases use case 210. This use case accesses recommender 202 in response to the request of user 20 for particular content. Recommender 202 provides content either in the form of information that may output on the screen of user 20, actual goods or services, or any other content known to those skilled in the art.

Figure 4:
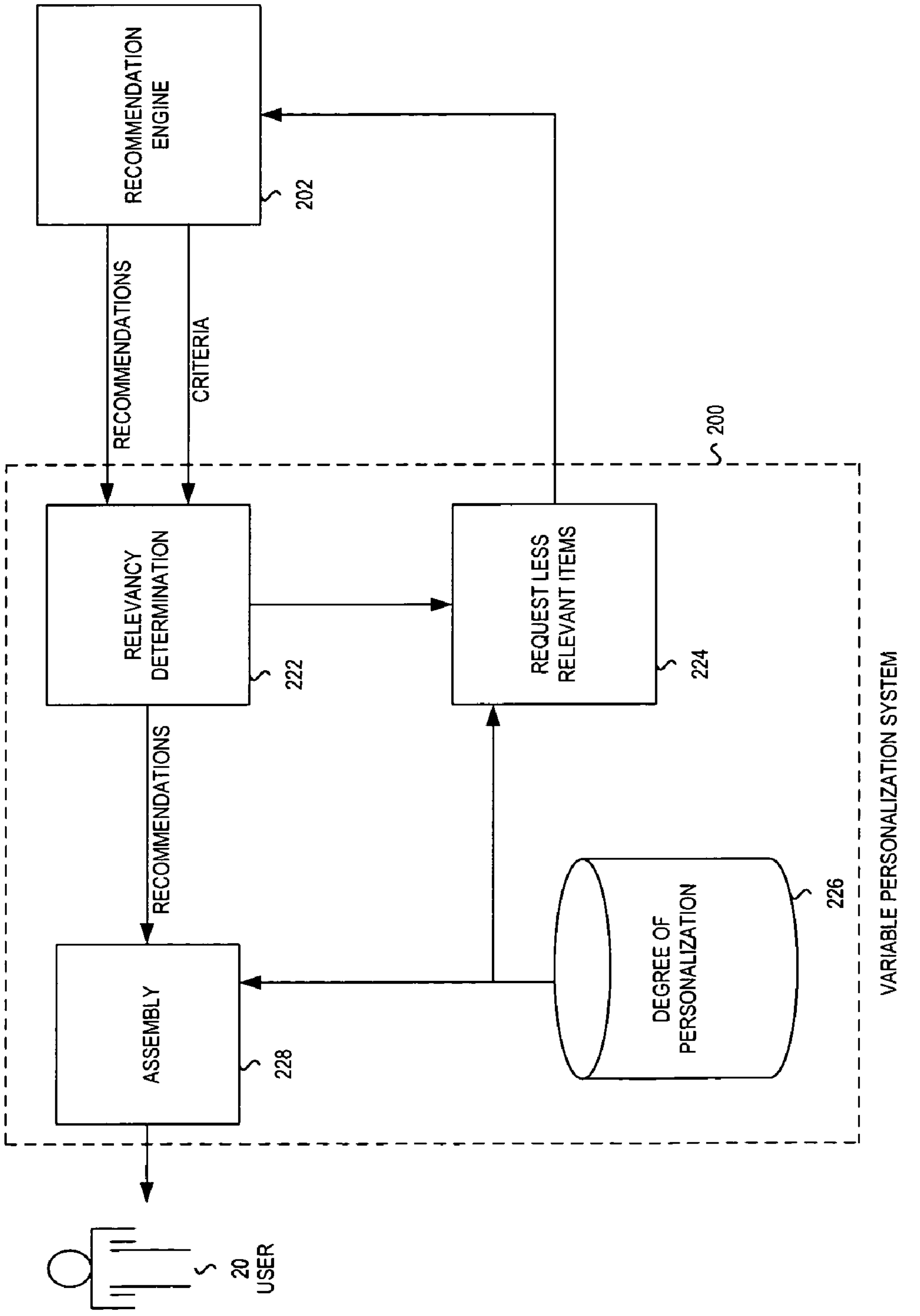
FIG. 4 is a flow chart describing the variable personalization system.

FIG. 4 is a block diagram showing how the variable personalization system 200 interacts with user 20 and the recommendation engine 202. The recommendation engine 202 provides recommendations and criteria for those recommendations to variable personalization system 200. The variable personalization system 200 determines the relevancy of those recommendations. If there are enough items that fall in the area of expanded interest, the variable personalization system 200 may forward the results on to the assembly block 228. If the variable personalization system 200 finds that not enough items of less relevancy, such as those that would fall into the area of expanded interest, have been produced, the request less relevant items block 224 again accesses the recommendation engine 202 requesting less relevant recommendations. A degree of personalization data store 226 offers input into the ratio of less relevant items to more relevant items (items of expanded interest to items of interest) that should be provided. The degree of personalization data store 226 also provides preferences to the assembly block 228 concerning the layout of the assembly and structure of the personalized layout. Finally, the assembly block 228 outputs the items in a more useful format to user 20.

FIG. 5 illustrates a representation of an area of interest 302 in a first area represented by a circle having a radius of R1 304, and an area of expanded interest 306 as represented by the annular region enclosed between the circle of radius R2 308 and the circle of radius R1 304. As will be discussed, parameters used in the various approaches taken to recommendation engines can be related to R1 304 and R2 308, thus providing the ability to select items from an area of interest 302, an area of expanded interest 304, or the area of disinterest defined as the area outside of the circle with radius R2, the area of disinterest 310.

Recommendation engines and systems for selecting items for presentation to a user based on preferences generally rely on one or more measures of applicability of that item to the user. For example, content based filtering systems take items known to be of interest to a user and review the content of other items to determine if the other items have a sufficient degree of similarity to the items of known interest to be presented to the user. Collaborative filtering systems measure the similarity between users to determine if items of interest to a first user (e.g. user A) are likely to be of interest to a second user (e.g. user B) because of similarities between A and B. In a collaborative filtering system the degree of similarity is determined between users, thus avoiding the need to inspect content. Belief or Bayesian networks rely on probabilistic inferences and known preferences, habits, or history of the user to determine if an item is likely to be of interest to that user. In all of these systems a degree of similarity or a probabilistic measure is used to determine if an item is likely to be of interest to the user.

Examples of purposes of recommendation engines include:

1. Attempt to help each customer find a small, more manageable subset of products that may be more valuable to him/her from amongst thousands of products;
2. Seek to determine the customer's specific product preferences by analyzing the customer's purchase behavior and product usage feedback (profile generation); and
3. Seek to exploit information from other customers that is similar to a given customer in some form or another.

Examples of common types of recommendation engines include:

1. Non-personalized system: recommend products to individual consumers based on averaged information about the products provided by other consumers. Here, the same recommendations are made to all consumers seeking information about a particular product(s) and all product recommendations are completely independent of any particular consumer.
2. Item-to-item system: recommend other products to an individual consumer based on relationships between products already purchased by the consumer or for which the consumer has expressed an interest. No explicit input regarding what the consumer is looking for or prefers is solicited by these systems, all information on which the relationships are built are implicit.
3. Attribute-based system: utilizes syntactic properties or descriptive "content" of available products to formulate their recommendations. Here, the system assumes that the attributes of products are easily classified and that an individual consumer knows which classification he/she should purchase, without help or input from the recommendation system.
4. Content-based filtering: is a system by which "features" are associated with specific products are then used in conjunction with rating/feedback obtained by the consumer, thus characterizing the user, to recommend products best suited to the consumer's interests. The prediction is blind to date from other users and the system assumes all product ratings are binary (i.e. positive or negative).
5. Collaborative filtering: recommends products that "similar users" have highly rated. The goal of collaborative filtering is to fill in the "blanks" (or unknown information) where no ratings data is found, with accurate predictions based on the ratings given by similar users mapped in the existing database being used.

As can be seen from Table I shown in FIG. 6, the various types of recommendation engines can be utilized with the present method and system. The mappings illustrated in Table I show how the relationships established in the recommendation engine can be mapped to the degree of relevancy: for each recommendation engine type items that are less relevant than those that would have been identified by the recommendation engine can be identified. By identifying relevant, but not necessarily recommended items, the system can select items from the expanded area of interest.

Recommendation engines can be utilized to suggest items for reading/viewing/purchasing, and users may browse such items and, for items being sold, may purchase them. Items which have been utilized by the user in one of these manners can be considered to be consumed.

Referring to FIG. 5, the variable personalization system has at least two modes of operation in respect to a recommendation engine. In one of these modes the variable personalization system requests items of interest from the recommendation engine. The items of interest fall within the area of interest 302, as defined by a radius 304. The variable personalization system evaluates whether the user wants items of expanded interest. If the user desires items of expanded interest, the variable personalization system requests a second set of items from the recommendation engine. The items of expanded interest fall within the area of expanded interest 306, as defined the annular ring formed by the radius of expanded interest 308 and the radius of interest 304. The second set of items has a lower degree of relevancy. Table 1 describes how relevancy is mapped to radius based on the results of various recommendation engines. The two sets of items are combined and outputted to the user.

Preferably, when a recommendation engine provides a list of items in order of decreasing relevancy, the variable personalization system picks two sets of items from the list. The variable personalization system picks the first set of items based on the radius of interest 304. The variable personalization system picks the second set of items based on the annular ring formed by the radius of expanded interest 308 and the radius of interest 304. The two sets of items are combined and outputted to the user. The variable personalization system preferably moderates the combination based on a set ratio. Preferably, this ratio may be controlled by user input. Alternatively, the variable personalization system moderates the combination by controlling the radius of interest and the radius of expanded interest. In one embodiment, the user controls these radii.

Referring again to FIG. 5, the degree of similarity or probabilistic measure (denoted as "p") of the recommendation engine can, in one embodiment, be related to the radii R1 304 and R2 308 through an inverse relationship in which a high degree of similarity or high degree of probability of interest results in a position closer to the center of the circle. For simplicity it can be assumed that the values of similarity or probability are normalized such that a value of $p=1$ indicates that the system believes that there is complete certainty that the user will have interest in the item. The degree of similarity or probabilistic measure can be related to the radii of FIG. 5 through the relationship $r=(1/p)-1$, where r represents the radial distance from the center for an item being tested. As can be readily understood, items that are likely to be of less interest to the user will lie farther from the center of the circle, and an item (or similar user in the case of collaborative filtering) the system believes to be of no interest whatsoever will be placed at an infinite distance from the center. By establishing different radii it is possible to create a "zone of comfort" within R1 304 and the zone of expanded interest 306 which is still an area which may contain items of interest to the user, but will not have items perceived as "too far out" for their liking.

Figure 7:
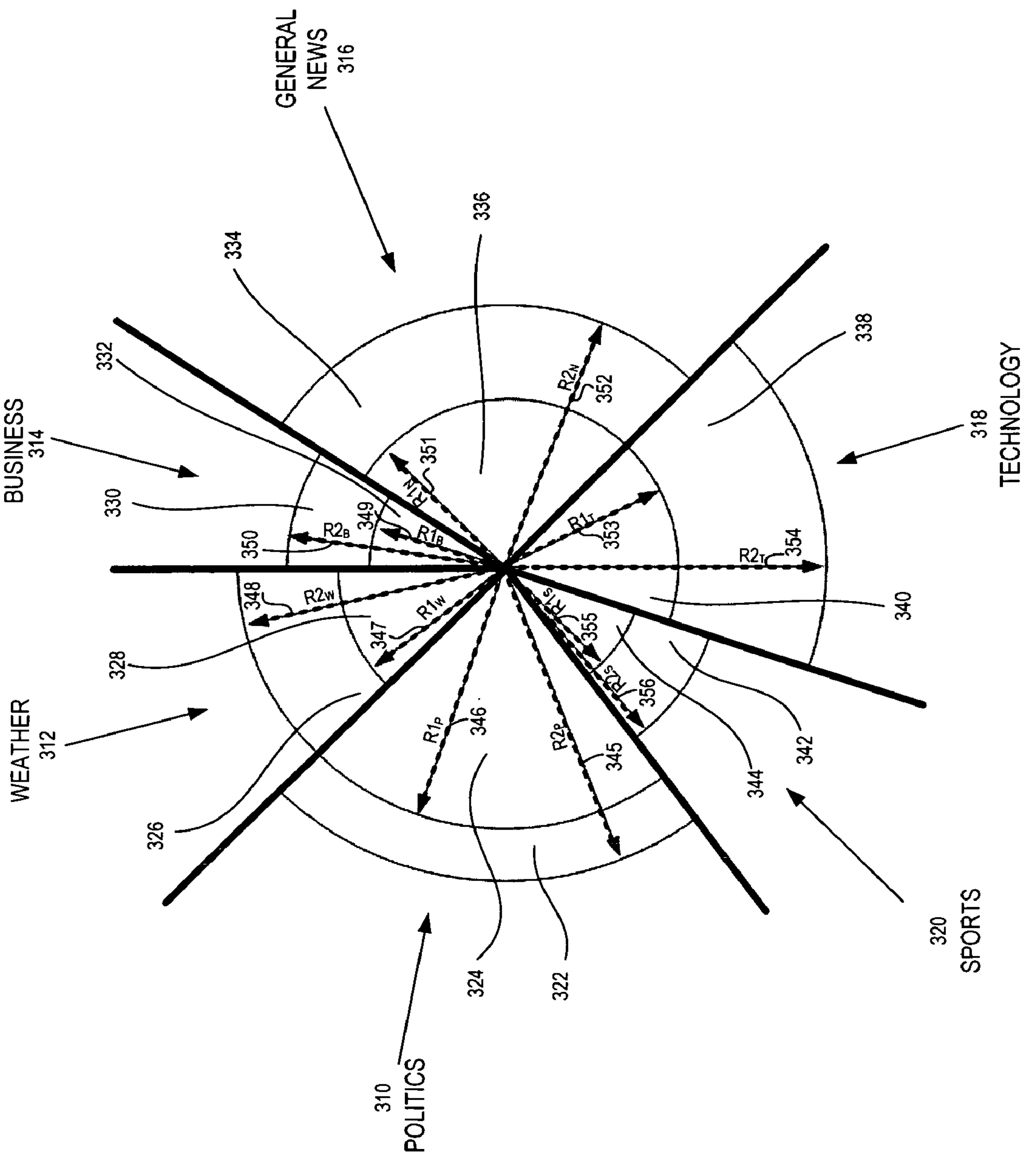
FIG. 7 represents categorization or segmentation as applied to the present system and method such that different areas of interest and areas of expanded interest can be created for different categories.

FIG. 7 represents categorization or segmentation as applied to the system described with reference to FIG. 5 such that different regions of interest and regions of expanded interest can be created for different categories. This allows the system to establish distinct areas of interest (and expanded areas) for different news topics, different types of advertisements, or different categories of items for sale. For representation in a database angular position can be used to categorize items or put them into genres, although other representations can also be used.

FIG. 8 illustrates one possible degree of personalization control with which the user may interact. As the user slides the bar to the right he or she will receive more items that fall outside of the user's area of interest. There are at least three methods that may achieve this result. First, the ratio of items of interest as compared to items of expanded interest may be modified such that more items of expanded interest are retrieved in relation to the items of interest. Second, the radius of the area of expanded interest may be increased such that more items are captured. Third, a combination of changing the ratio of items and changing the radius of the area of expanded interest may be used. As the bar is moved to the right the relevancy value gets smaller and smaller resulting in a much larger radius and therefore a much larger item capture area. The further to the left that the bar is moved the larger the relevancy value becomes resulting in a much small area of interest and more items that exactly match the interests of the user.

Figure 9:
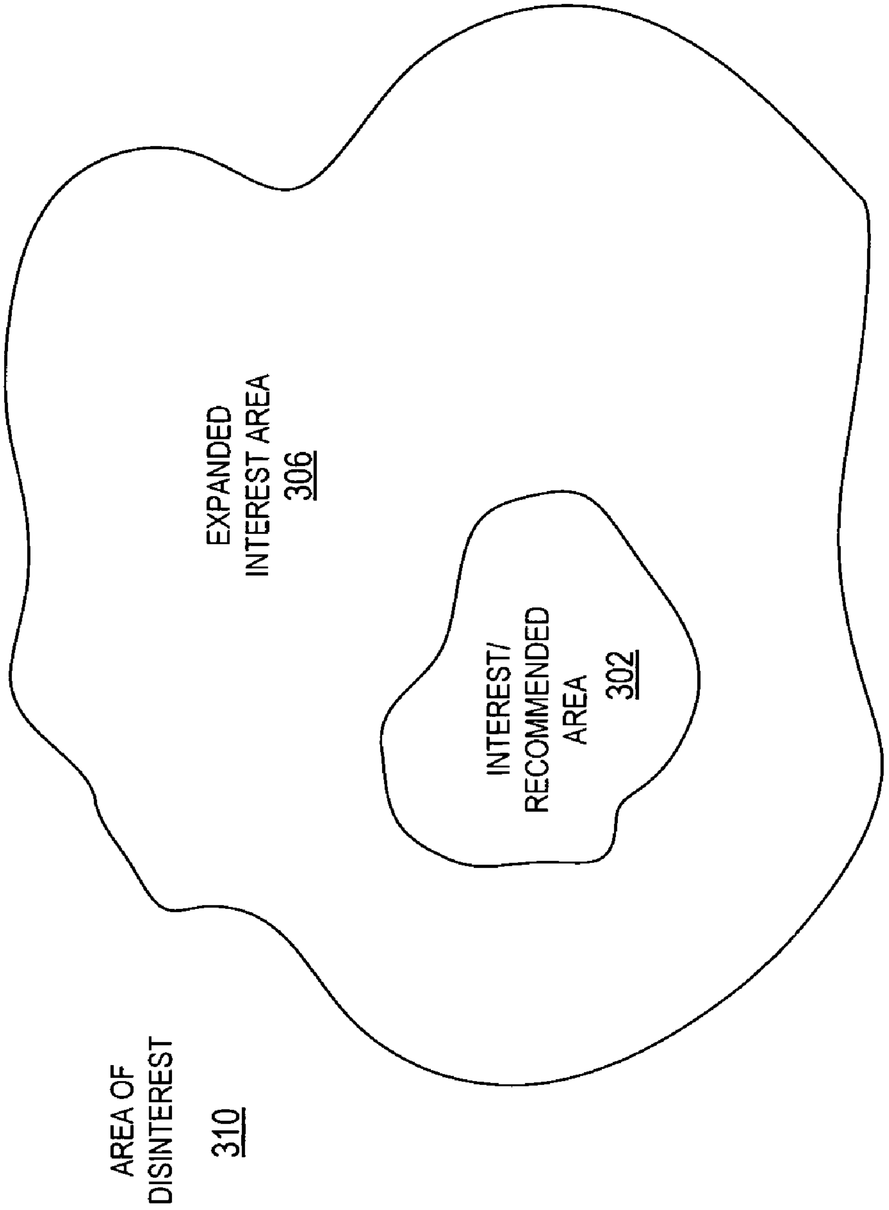
FIG. 9 represents a system in which a different, non-circular/annular geometric representation is used to represent the area of interest, area of expanded interest, and area of disinterest.

FIG. 9 represents a system in which a different, non-circular/annular geometric representation is used to represent the area of interest 302, area of expanded interest 306, and area of disinterest 310. As will be understood by one skilled in the art, different mathematical relationships can be established to create areas of interest and expanded interest, with corresponding geometrical representations.

As an example of the use of the present method and system a recommendation engine will, based on user history, user preferences, or a user profile (all of which can be considered to be user information) select items for presentation to the user. The recommendation may be based on content filtering, collaborative filtering, belief networks, combinations of the aforementioned techniques, or other techniques that generate a probabilistic measure of the likelihood that the user will have an interest in the item. By establishing at least two criteria or ranges, it is possible to label or select items believed to be of high interest (region of interest items) and items of lesser but potential interest (region of expanded interest items). In one embodiment items falling outside of both of these regions are considered to be items in the region of disinterest and are not presented to the user.

As previously described, the present method and system can be applied to electronic publishing to create content that is personalized, but to a limited extent. By creating a region of expanded interest and selecting a given number of items from this region for presentation to the user, the user receives content that is more general in the sense that it has items that the user might not have seen on a highly personalized publication. In one embodiment the ratio between items of interest and items of expanded interest can be varied to change the degree of personalization. When used in conjunction with the criteria establishing the foundries for the region of interest and region of expanded interest (e.g. R1 and R2 respectively) it is possible to vary the degree of personalization continuously.

As an illustration of the aforementioned principle the system may be set up such that items lying in the range of $0>r>10$ ($R1=10$) are considered to be in the area of interest while items in the range of $10>=r>100$ are considered to be in the area of expanded interest, and items lying in $r>=100$ are considered to be in the area of disinterest. For presentation, a ratio of items of interest/items of expanded interest can be established. For example, one item of expanded interest can be presented for every item of interest. If the user desires a more personalized publication, the ratio can be increased, and/or the radius R1 decreased. For users that desire more articles of potential interest while still having a personalized publication the ratio can be decreased. Users desiring a less personalized publication can have the radius R1 increased. For a user desiring no personalization the radius R1 would be set at $R1=\infty$, indicating that all items were in the area of interest, and that a generalized publication (e.g. identical to the print copy) was desired.

Referring again to FIG. 7 users may desire to have different criteria (such as radii) established for different subject areas or categories such that the degree of personalization varies for the different categories. For example, one user may not want to see any sports articles, may want no personalization of business news, and may want highly personalized technology stories with a significant number of items selected from outside what the system perceives as their area of interest. As can be understood by adapting the criteria and ratios for each of these categories the system can present content that is personalized (or not) to different extents in different topics and which offers the user content that the system might not perceive of high interest but that the user is in fact drawn to.

Still referring to FIG. 7, each area of interest is represented by a segment of the total area, for example politics area 310, weather area 312, business area 314, general news area 316, technology area 318, and sports area 320, although additional or fewer areas of interest may be utilized without departing from the spirit and scope of the present system and method. Within each area of interest an inner and an outer area of interest is shown. For example, the politics area 310 shows an inner area of politics 324 and an outer area of politics 322. The inner area of politics 324 is defined by the radius $R1_P$ 346 and the outer area of politics 322 is defined by the radius $R2_P$ 345. The inner area of politics 324 represents content having relevancy (R) to the political area such that one over the relevancy is less than the radius $R1_P$ ($1/R<R1_P$). The inner area of politics 324 also corresponds to what has been referred to as the area of interest. Items falling in this area will be those the user requested to be included in his or her area of interest based on the preferences established for that user. It is important to note that preferences may be developed according to a variety of processes as described previously in this application.

Similarly, the outer area of politics 322 represents content having relevancy to the political area such that one over the relevancy is less than the radius $R2_P$ 345 but also greater than the radius $R1_P$ ($R1_P<1/R2_P$). The outer area of politics 322 also corresponds to what has been referred to as the expanded area of interest.

Each area of interest may be categorized by its own inner and outer area. Each inner and outer area is defined by the related radii. For example, concerning the weather area 312, the inner area of weather 328 is defined by $R1_W$ 347 and the outer area of weather 326 is defined by $R2_W$ 348; concerning the business area 314, the inner area of business 332 is defined by $R1_B$ 349 and the outer area of business 330 is defined by $R2_B$ 350; concerning the general news area 316, the inner area of general news 336 is defined by $R1_N$ 351 and the outer area of general news 334 is defined by $R2_N$ 352; concerning the technology area 318, the inner area of technology 340 is defined by $R1_T$ 353 and the outer area of technology 338 is defined by $R2_T$ 354; and concerning the sports area 320, the inner area of sports 342 is defined by $R1_S$ 355 and the outer area of sports 344 is defined by $R2_S$ 356. In each case the inner radii (1 series radii ($R1_P$, $R1_W$, $R1_B$, . . . )) represent how relevant the user desires content in that particular area of interest to be. For example, the small inner radius $R1_B$ 349 of business 314 conveys that the user only desires business stories that have a high degree of relevancy, while the large inner radius $R1_P$ 346 of politics area 310 conveys that the user desires to have content that is considered to have a much lower degree of relevancy be considered an item of interest.

Similarly, in each case the outer radii (2 series radii ($R2_P$, $R2_W$, $R2_B$, . . . )) represent how relevant the user desires content in that particular area of expanded interest to be. For example, the small outer radius $R2_B$ 350 of business area 314 conveys that the user only desires business stories that have a higher degree of relevancy to be in the area of expanded interest, while the large outer radius $R2_P$ 346 of politics area 310 conveys that the user desires to have content that is considered to have a much lower degree of relevancy be considered an item of expanded interest. Further, the difference between the outer and the inner radii shows what is referred to as the degree of personalization. A large difference suggests a lower degree of personalization, while a smaller difference suggests a large degree of personalization because only results within the user's area of interest will be returned.

In one embodiment content not perceived to be of high interest (items from the region of expanded interest) is always inserted to some extent to insure that if the system begins to acquire false beliefs regarding user preferences the users will have other items to choose from besides the items the system (falsely) believes to be of interest. As a result the system can "recover" from instances of bad learning, mistaken preferences, or other errors that recommendation engines may be prone to.

FIG. 10 illustrates a class diagram showing three classes of items that may be utilized by the expanded interest recommendation engine or the variable personalization system, a story class 370, an item class 372, and an ad class 374. Story class 370 contains six attributes: source, title/headline, date, category, circulation, and length. Item class 372 contains six attributes: product number, name, color, size, target market, and price. Ad class 374 contains five attributes: title, size/length, advertiser, target market, and category. The attributes within each class may be analyzed to determine whether a particular story, item, or ad falls within a user's area of interest or area of expanded interest. These attributes can further be analyzed to determine the relevancy of a particular item.

Figure 11:
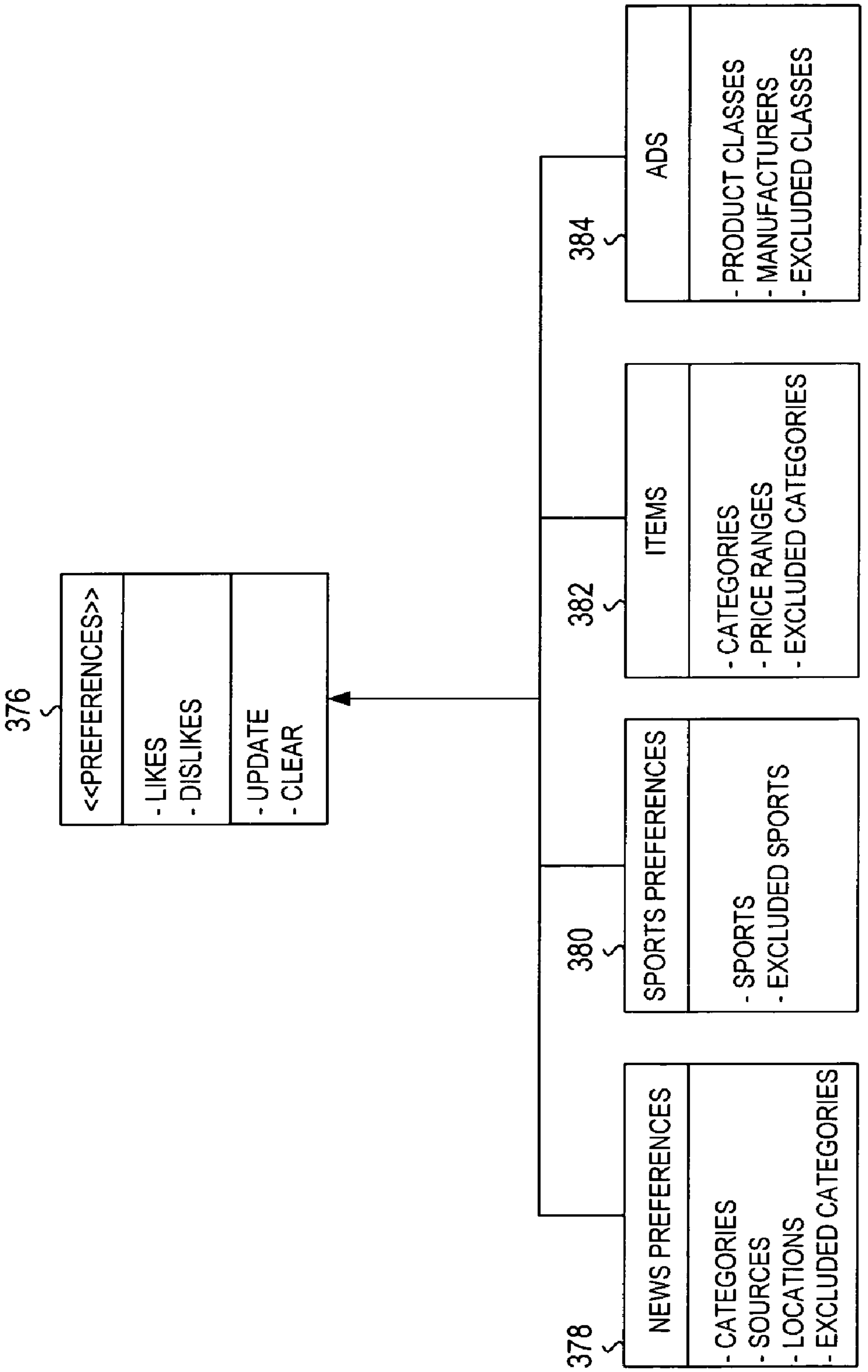
FIG. 11 illustrates a class diagram for user preferences.

FIG. 11 illustrates in a class diagram how user preference information may be organized. The superclass is preferences class 376, containing the attributes likes and dislikes and the operations update and clear. The user may update and clear his preferences from preference class 376. The preference class 376 is associated with a number of subclasses: news preferences class 378, sports preferences class 380, items class 382, and ads class 384. Each subclass has its own specific attributes: news preferences class 378 has attributes categories, sources, locations, and excluded categories; sports preferences class 380 has attributes sports and excluded sports; items class 382 has attributes categories, price ranges, and excluded categories; and ads class 384 has attributes product classes, manufactures, and excluded classes.

Figure 12:
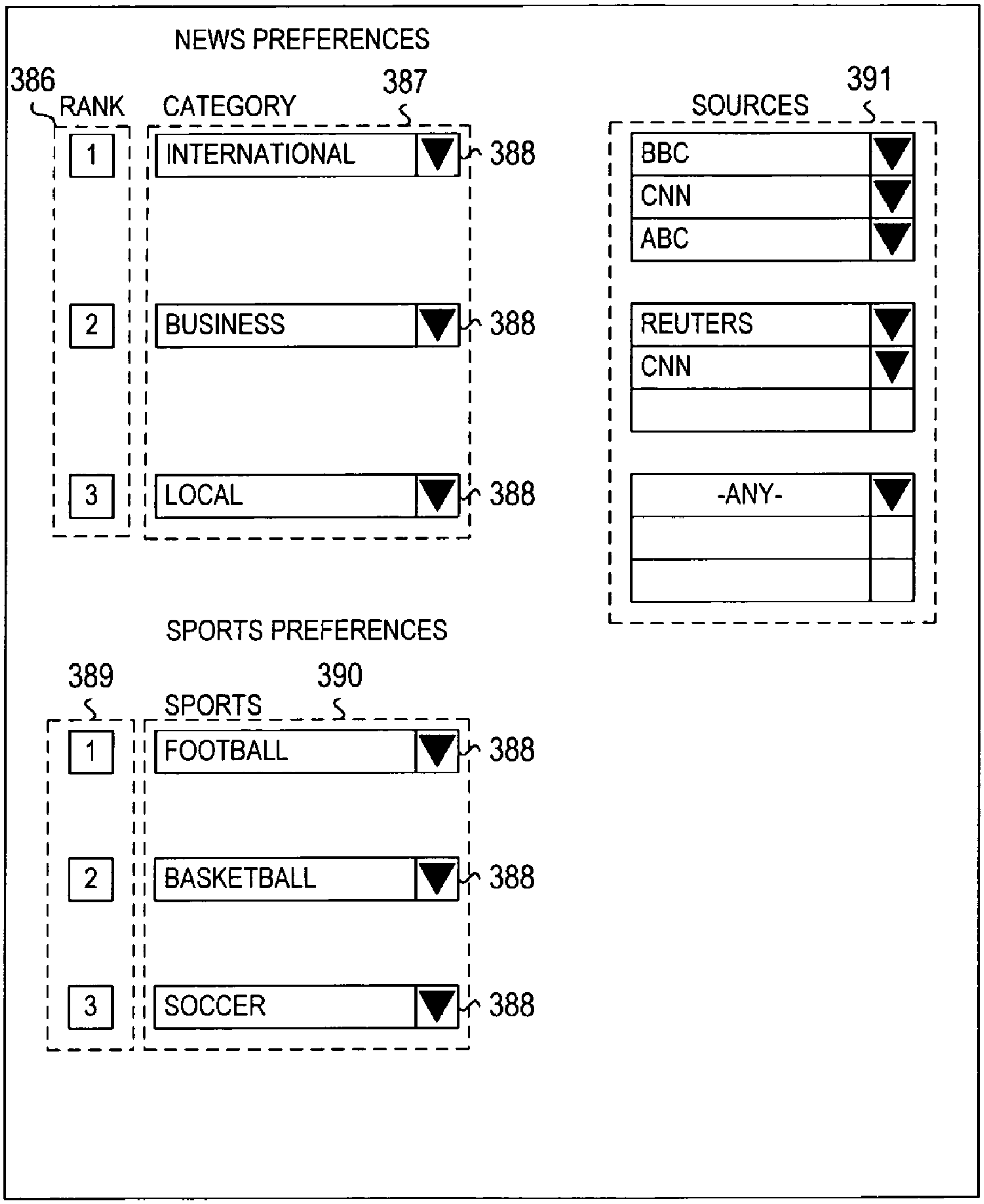
FIG. 12 illustrates a Graphical User Interface (GUI) that users may interact with to express and control their preferences.

FIG. 12 shows an example of news preferences and sports preferences. It represents how a user might encounter preference data and be allowed to modify the preference data. User may use a news rank control 386 to rank each news category 388. The news category 388 may be modified using a pull down control 390. User may also choose sources from the news sources 396. Similarly, user may use a sports rank control 386 to rank his or her sports preferences. The sport 394 may be modified using a pull down control 390. Greater levels of details than shown for determining user preferences may be used. Additionally, user preferences need not be selected by the user, but instead may be determined by mining user actions.

Figure 13:
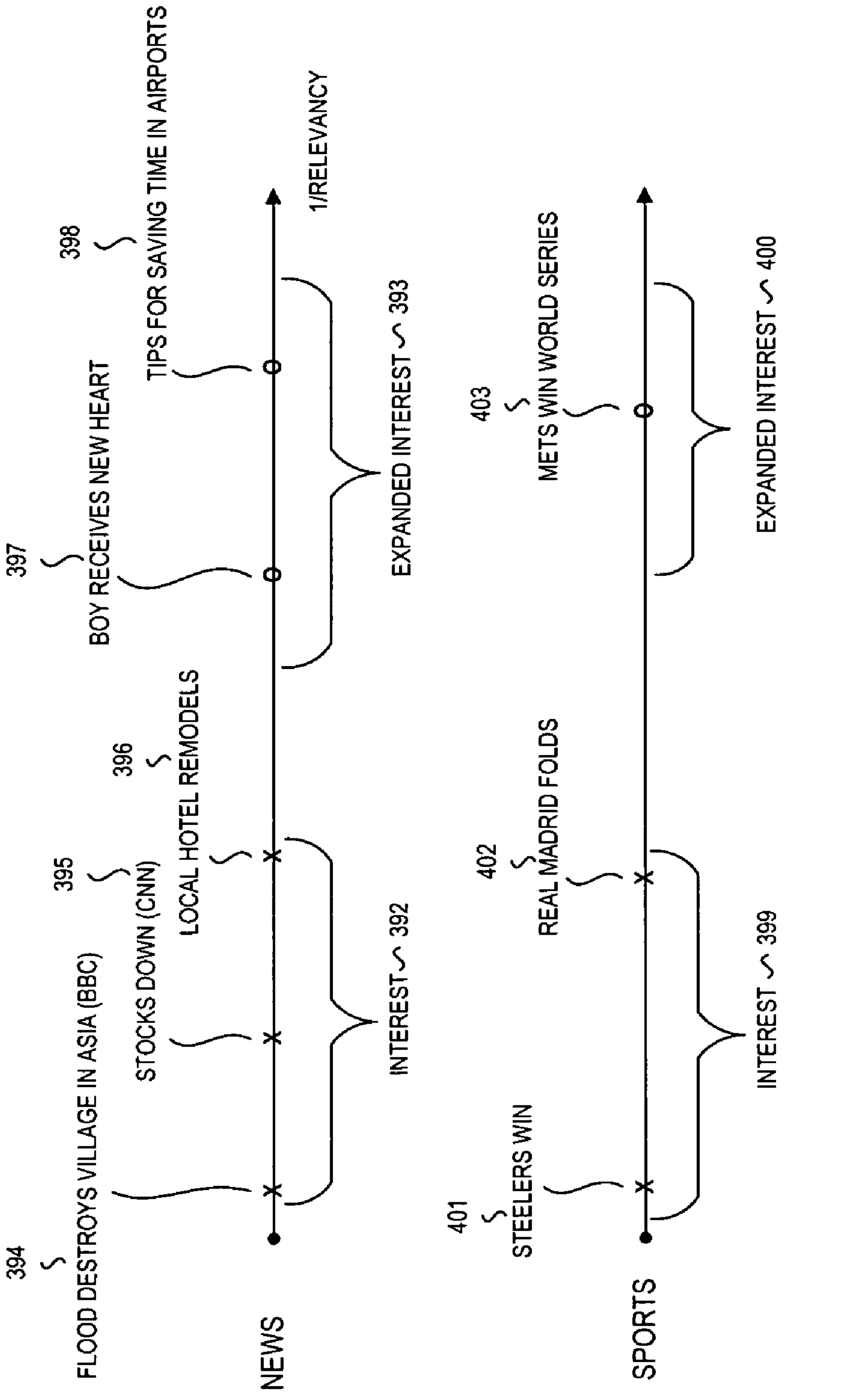
FIG. 13 illustrates two possible radii related to relevancy and shows where potential stories may fall on the relevancy scale.
Figure 14:
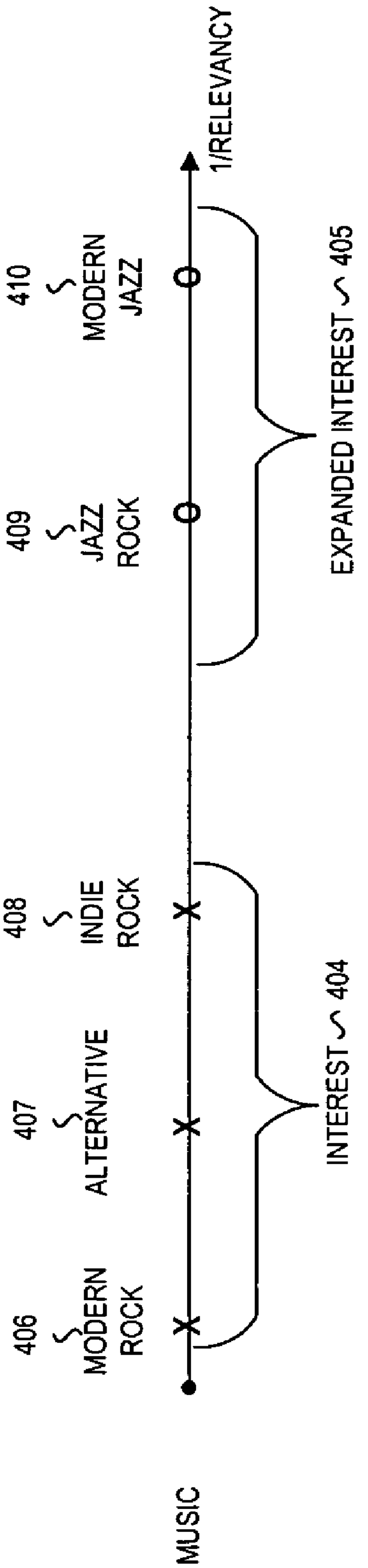
FIG. 14 further illustrates a possible radius related to relevancy and shows where potential stories may fall on the relevancy scale.

FIGS. 13 and 14 illustrate how relevancy relates to interest and expanded interest areas and to particular news items. The distance from the origin on the news scale may be measured by 1/R where R is equal to the relevancy value. News items which fall into the interest area 392 to a user will have high relevancy, and therefore will be located near to the origin. News items which have lower relevancy will fall into the expanded interest area 393. Finally, news items with no relevancy to user interests with have a relevancy value of close to zero and will therefore be infinitely far from the origin. In this example the user is interested in international news primarily, followed by business, and local news. Therefore the series of stories 394, 395, 396 are located in the interest area 392. An "x" marks the location of the series of stories 394, 395, 396. This indicates that they were selected as items of interest. The series of stories 397, 398 do not have a high R value and therefore are located in the expanded interest area 393. An "o" marks the location of the series of stories 397, 398, indicating they were selected as items of extended interest.

Further, the user is interested in sports and selected his interest areas to be Football, Basketball, and Soccer. Since the series of stories 401, 402 have a high R value, they are located in the interest area 399. Story 403 has a much lower R value because it does not fall into one of the user's selected areas of interest. It does however have some relevancy to a user who selected Football, Basketball, and Soccer to be interest areas and therefore is found in the expanded interest area 400. Further, this selection may, in one possible embodiment, be explained by the high news value of story 403 or by the high popularity of story 403.

Referring now to FIG. 14, here the user has indicated preference in the area of modern rock, alternative, and indie rock. The series of items 406, 407, 408 are items containing content in the area of indicated preference and have high relevancy and therefore are located in the interest area 404. The series of items 409, 410 have a lower relevancy value and therefore are located in an expanded interest area 405.

Figure 15:
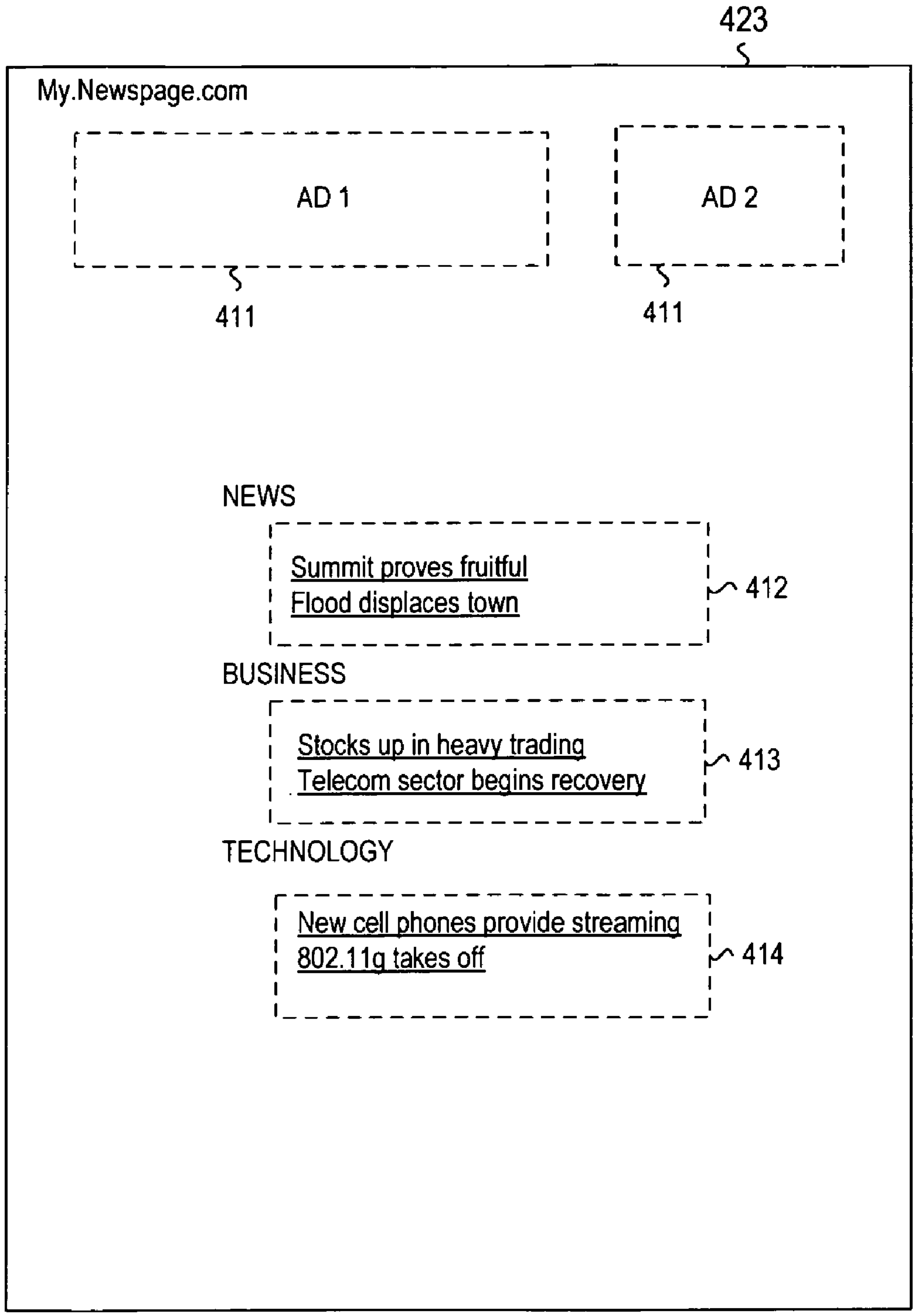
FIG. 15 illustrates an electronic publication containing both advertisements and news in the form of hyperlinked headlines.

FIG. 15 illustrates an electronic publication 423 containing both advertisements 411 and news in the form of a series of hyperlinked headlines 412, 413, 414. The user is able to read the news by clicking on the series of hyperlinked headlines 412, 413, and 414, which accesses the underlying news article. Advertisements 411 are also present, and by clicking on the advertisement 411 the user can access additional product information. The electronic publication 423 can be personalized in the sense that the series of hyperlinked headlines 412, 413, 414, may be filtered for the user and the advertisements 411 can be targeted based on user preferences, user history, or a user profile. Alternatively, the user may simply be presented with headlines from categories they have selected to be present on the page. Alternatively, a catalog can be organized in a similar manner.

Figure 16:
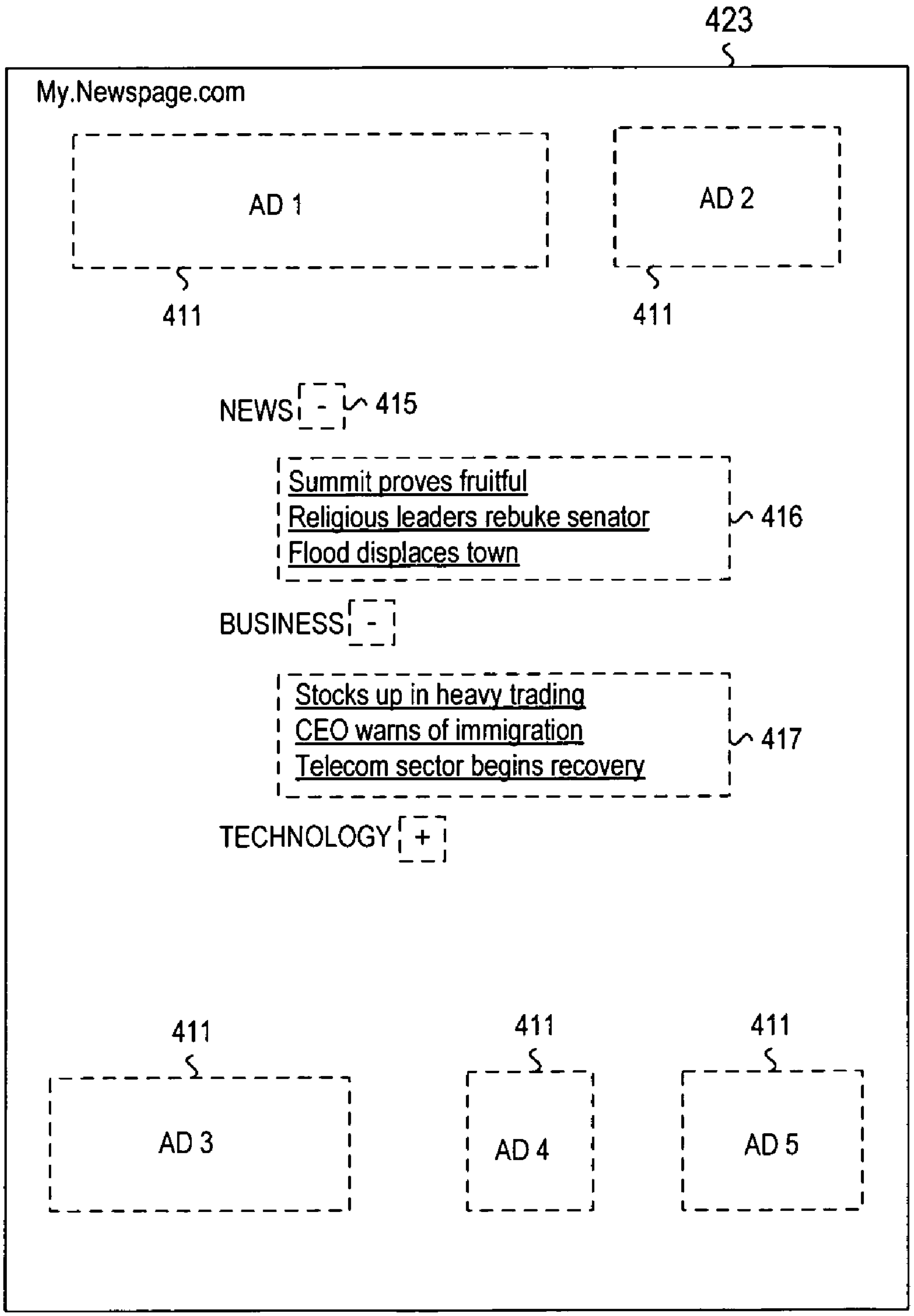
FIG. 16 illustrates an electronic publication with collapsible menus or categories in which headlines are only presented when the menu or category is expanded.

FIG. 16 illustrates an electronic publication with collapsible menus 415 or categories in which headlines the series of hyperlinked headlines 416 and 417, are only presented when the menu or category is expanded. This method of electronic publishing offers the possibility of presenting more categories on one page.

Figure 17:
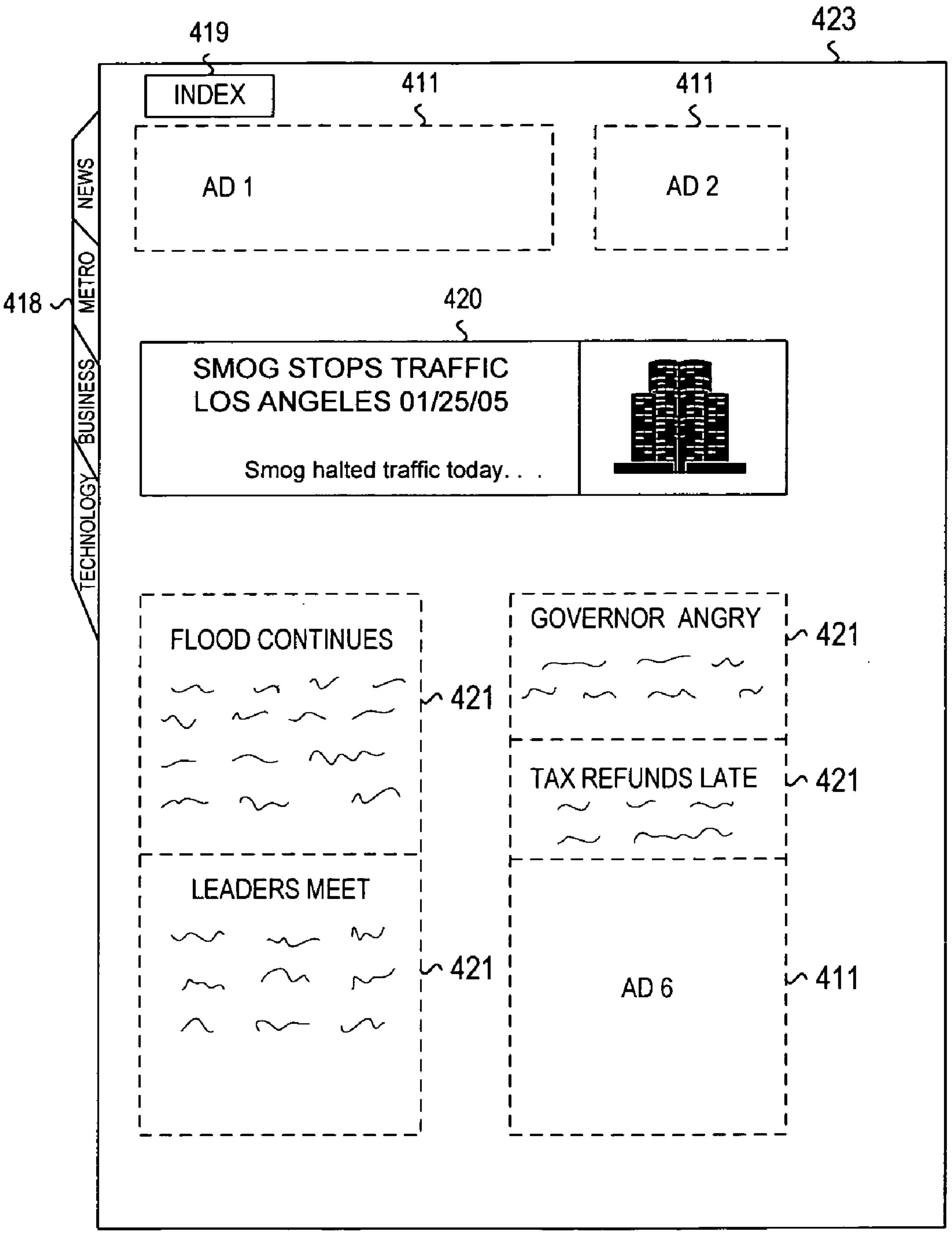
FIG. 17 is an example of electronic publication.

FIG. 17 illustrates an electronic publication 423. The electronic publication preferably resembles a printed publication in that it is based on a layout that is similar, if not identical to the printed version. For example, the center portion of the publication represented in FIG. 16 may be identical to the front page of the newspaper. In one embodiment the advertisements 411 are the general advertisements found in the printed version. In an alternate embodiment the advertisements 411 are targeted advertisements.

Still referring to FIG. 17, an index 419 may be present as represented in the upper left hand portion of the FIG. In one embodiment the index 419 is personalized and the linked headlines 420 and articles 421 are selected based on user preferences, user history, or a user profile. As will be discussed, the index 419 can be personalized to a greater or lesser extent, and items likely to be of interest, but not within their direct region of interest, can be added to the index 419.

In an alternate embodiment, the electronic publication represented in FIG. 16 is personalized by selecting articles 421 for presentation and creating a print-like layout. Articles 421 can be appropriately scaled and a layout created that presents a sufficient amount of the article 421 (e.g. headline, or headline and photo) to indicate the content to the user. Alternatively, the articles 421 can be used based on the print layout, with the page layout being modified to accommodate the articles.

As is also illustrated in FIG. 17 bookmarks or tabs 418 may be present. The bookmarks 418 may be personalized or they may be generic or general such at all users see the same bookmarks or tabs 418.

Figure 19:
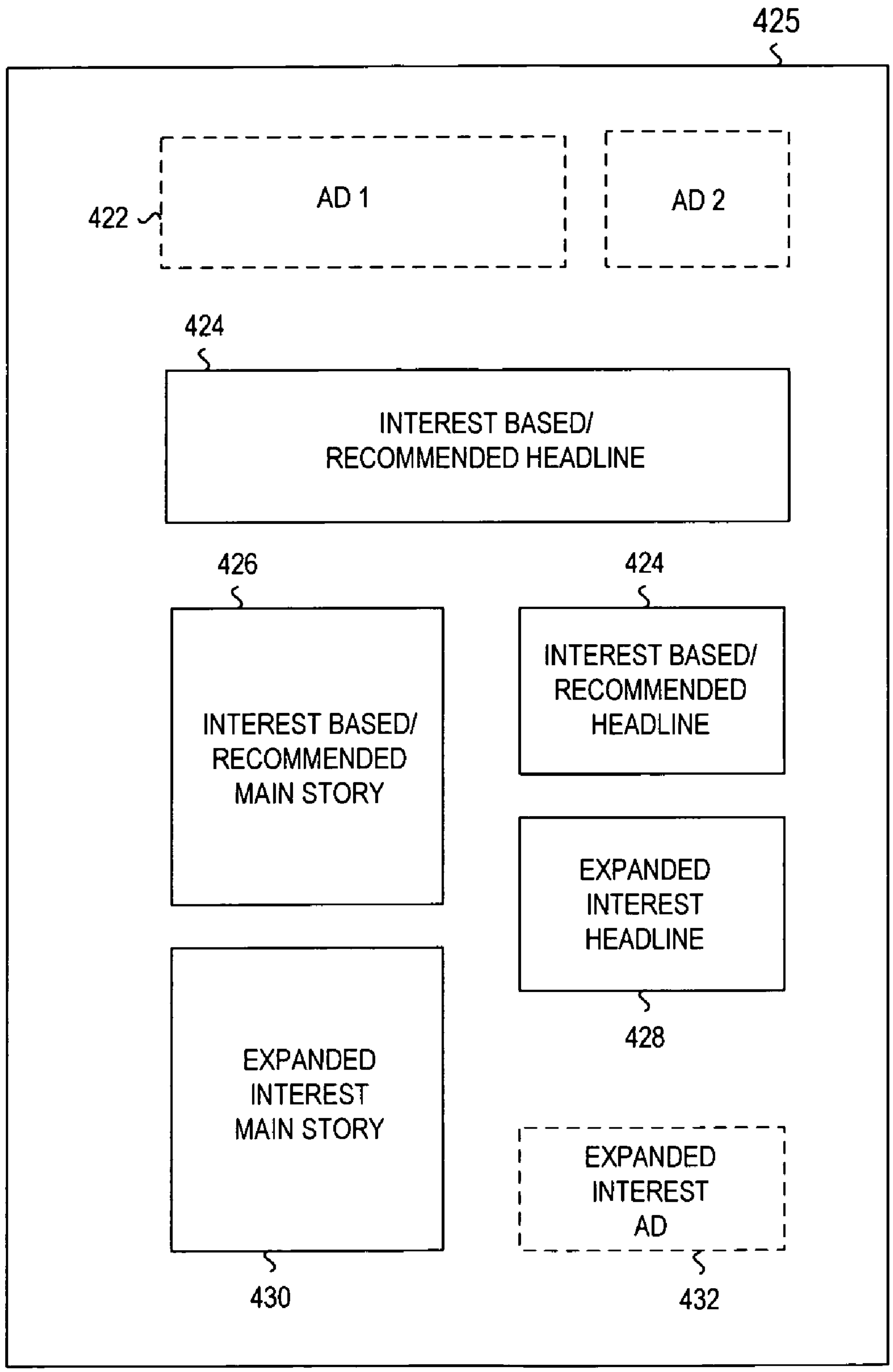
FIG. 19 illustrates an electronic publication in which the content of the news queue of FIG. 18 is laid out and presented to the user.

FIG. 18 illustrates the use of regions of interest and expanded regions of interest to create a "news queue" for subsequent layout and presentation to the user. As can be seen in FIG. 19 items from within the region of interest are combined with items from expanded regions of interest. In this way the user sees not only articles that the user or the system has determined match their profile, but also sees articles that are of potential interest. By combining expanded interest articles with interest based/recommended articles, an electronic publication can be created that has desirable attributes of a generalized print-identical electronic publication combined with a personalized content electronic publication. Although news articles are illustrated in FIG. 19 the method and system is not limited to news but can be applied to items in a catalog or other content that is published electronically. Similarly, and as illustrated in FIG. 19, advertisements can be treated as items and advertisements from an expanded interest region can be selected.

FIG. 19 illustrates an electronic publication 425 in which the content of the news queue of FIG. 18 is laid out and presented to the user. In this example, the interspersing of interest based/recommended ads 422, interest based/recommended headlines 424, interest based/recommended stories 426, expanded interest headlines 428, expanded interest stories 430, and expanded interest ads 432 is realized through the two dimensional layout of the page. To the user, it would appear to be a seamless integration of interest based items 422, 424, and 426 with expanded interest based items of 428, 430, and 432.

Figure 20:
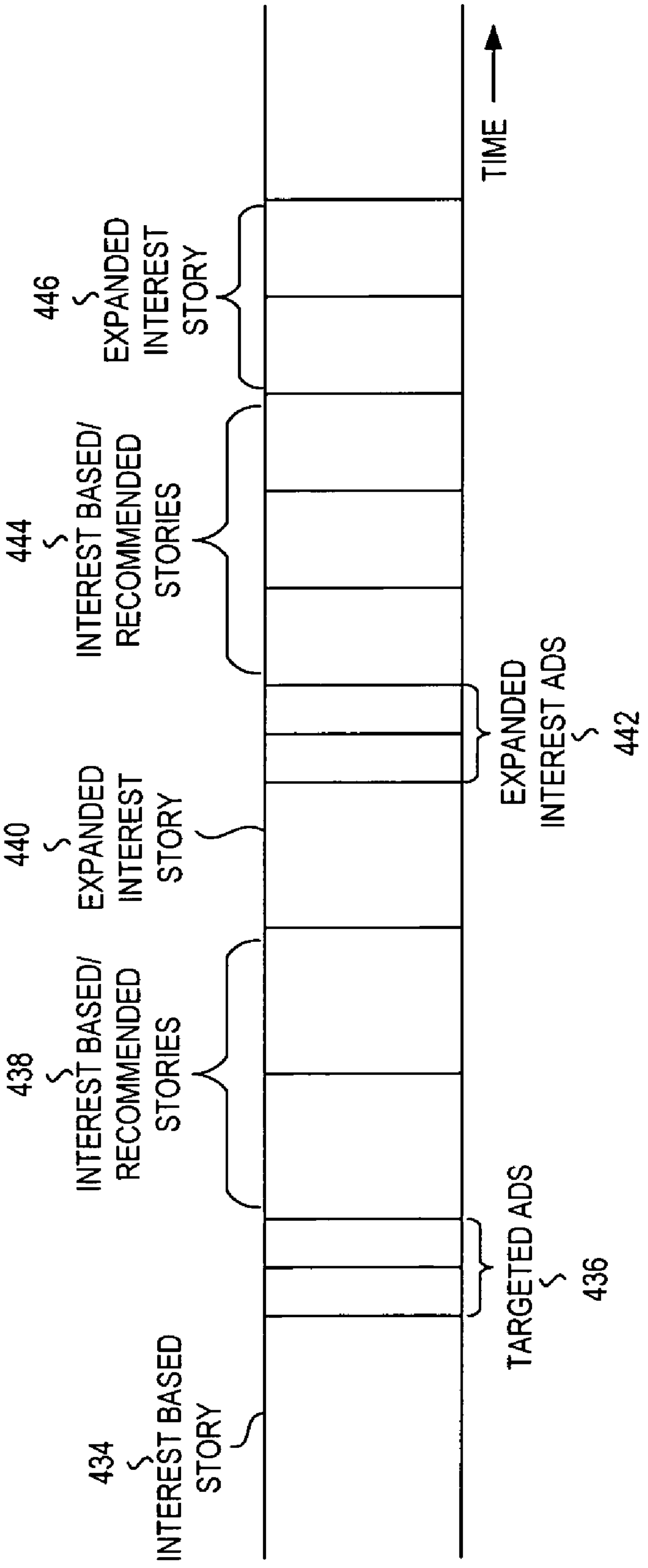
FIG. 20 illustrates the system and method as applied to video or other time related presentation means in which segments are selected for the creation of a customized presentation to the user.

FIG. 20 illustrates the present system and method as applied to a video or other time dependent information stream, in which segments are selected for the creation of a customized presentation to the user. This can be accomplished using on-demand and Personal Video Recorder video systems in which video segments are stored and can be combined to present a customized presentation. The example of this layout given in FIG. 19 is not intended to limit the layout, only give an example of an embodiment. The video might begin with an interest based story 434, followed by an interest based ad 436. An interest based story 438 might follow. Later, expanded interest stories 440 and expanded interest ads 442 would be integrated into the video, followed by an interest based story 444 and an expanded interest story 446, resulting in a seamless integration of interest items and expanded interest items. This would offer the viewer not only items that directly fit his or her interests, but in addition would offer items that might expand the viewers interest that likely would not have been presented by a standard recommendation engine.

Figure 21:
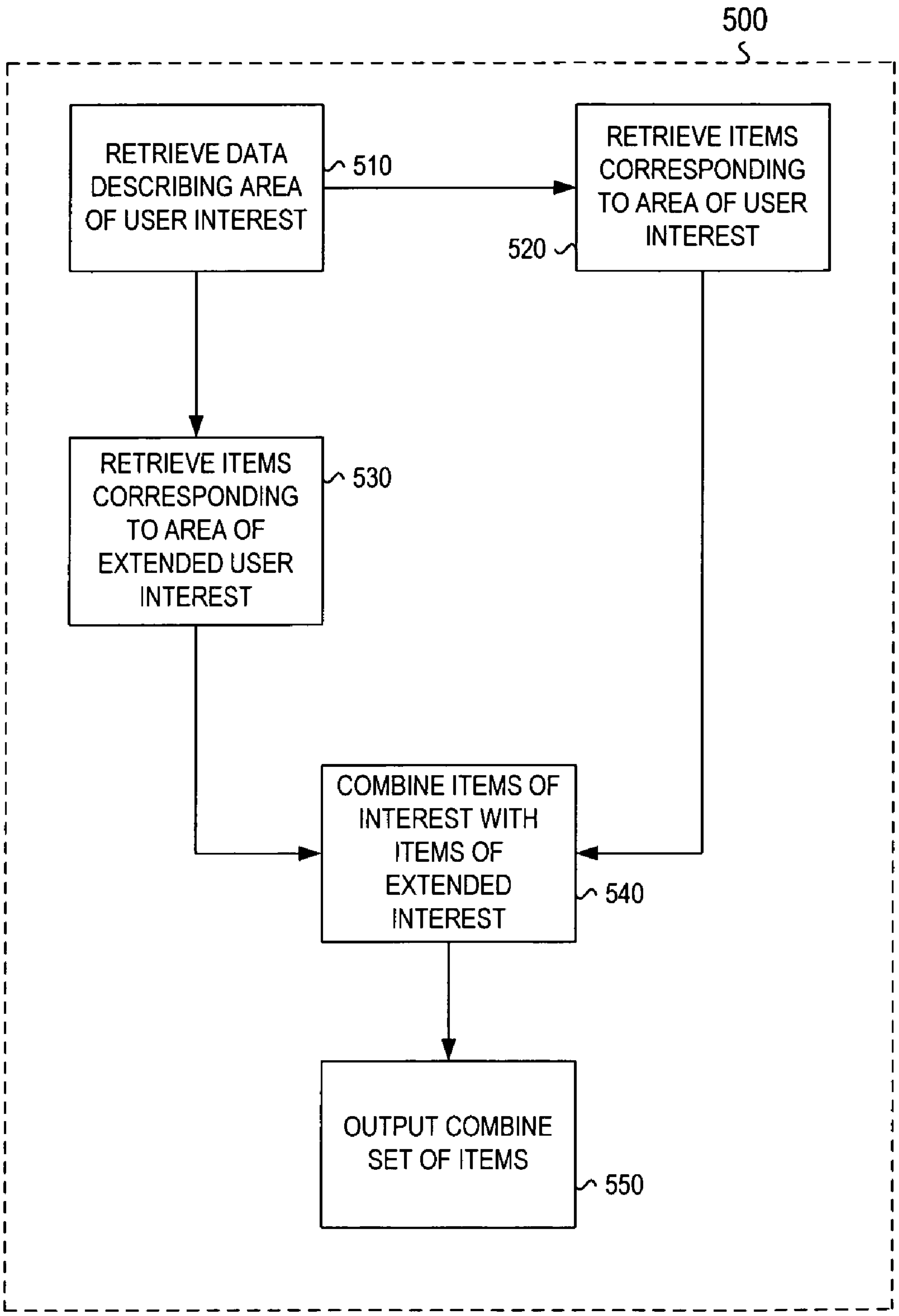
FIG. 21 illustrates a flow chart illustrating the selection and combining of items.

Referring to FIG. 21, in one embodiment, a computer system 500 in accordance with the present method and system, generates a partially personalized electronic data output 550 containing a combination of recommended and expanded interest items by first retrieving a first set of data 510 that describes the areas of the user's interests. This data 510 may be stored in many forms including, but not limited to: a traditional computer database file, or in web-based storage mediums such as a cookie, or alternatively may be entered at the time of generation of the partially personalized electronic data display.

The computer system 500 retrieves a first set of items 520 that correspond to the area of the user's interest. This procedure may be performed using one of many possible Recommendation Engines, including but not limited to content based filtering systems, collaborative filtering systems, or Bayesian (belief) networks. The procedure may also be preformed by the computer system 500 using the method of this invention itself. This first set of items may be selected from the category of recommended items that fall within the area of the user's interests. This area of interest may be calculated according to a user's interest in a particular area as measured by a radius. In one of many possible embodiments, the radius may be related to relevancy by radius is Fproportional to one over relevancy.

The computer system 500 retrieves a second set of items 530 that may be categorized as falling within an area of expanded interest but not in the area of interest. This area of expanded interest will have a larger radius and therefore encompass a larger possible area of interest and may contain additional items. In one embodiment of this invention the user can determine the ratio of the number of items selected from the inner radius, which corresponds to the area of interest, as compared to the number of items selected from the area corresponding to the outer radius, which corresponds to the expanded area of interest. In another embodiment, the user may alter the area of the expanded interest. In another embodiment, and area of disinterest may be excluded from the area of expanded interest to ensure that the user does not receive unwanted content.

The first and second set of items retrieved may fall in to many different categories of content, including, but not limited to, informational content, in the form of news stories written or video, entertainment content, and/or advertising content. Multiple systems may be functioning simultaneously or in concert, such that the two systems form an integrated layout, one system providing informational content and the other providing advertising content, or any possible combination of contents. Therefore, in one embodiment, a complete layout may include recommended interest items containing informational content, recommended interest items containing advertising content, expanded interest items containing informational content, and expanded interest items containing advertising content, all integrated on the same display.

The computer system 500 preferably combines 540 the first set of items retrieved with the second set of items. In one embodiment, this combination will intersperse the items so that they are oriented in an optimal distribution. This distribution may be at regular intervals, varying intervals, random intervals, or various other intervals know to those skilled in the art. By distributing the second set of items of expanded interest, collected by the retrieve a second set of items 530 step, within the first set of items of interest, collected by the retrieve a first set of items 520 step, (or recommended items generated by a recommendation engine), the user may not realize that items of expanded interest have been integrated into the regularly recommended items. This interspersing of items may be realized through a two dimensional layout or a linear series, or other layouts know to those skilled in the art. The two dimensional layout is not limited to, but may resemble a traditional periodical such as a magazine, newspaper, or newsletter. A layout of this form is an example of one embodiment because it will have the feel and appearance of a traditional newspaper, while offering personal customization and seamless integration of expanded interest items.

Additionally, the computer system 500 preferably redirects the recommendation engine and reconfigures user preferences based on user interest in expanded interest items. The user's reaction to items of expanded interest may be collected based on a variety of methods, including but not limited to, recording when the user activates the hyperlink of an expanded interest item, recording when an item of expanded interest is centered in the user's view screen, recording when an item of expanded interest is copied, recording when a user's cursor or pointer hovers over a particular item of expanded interest, or other indicators know to those skilled in the art. Indications related to the user's purchases may also be utilized, including but not limited to the record of the user's purchases. Based on user reaction the function of the recommendation engine is modified. In one embodiment, this modification is realized through the modification of user preferences. This modification of user preferences will over time modify the area of interest of a particular user. A process where preferences become extinct over time, unless items related to those preferences are selected may also be employed.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

Although the description above contains many specific examples, these should not be construed as limiting the scope of the invention but as merely providing illustrations of some of the presently preferred embodiments of this invention. Thus, the scope of the invention should be determined by the appended claims and their legal equivalents, rather than by the examples given.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A computer based method for generating a partially personalized electronic data output containing a combination of recommended and expanded interest items for a user, the method comprising:

receiving by a first computer, a first set of data describing an area of user interests;

receiving by the first computer, a first set of recommended items corresponding to the area of user interests;

presenting, to the user, by the first computer, a range of personalization values, the range comprising a minimum personalization value, a maximum personalization value and a plurality of additional values between the minimum and the maximum values, wherein the maximum personalization value corresponds to the first set of recommended items;

receiving by the first computer, a user selection of one of the personalization values;

receiving by the first computer, a second set of expanded interest items in an area of expanded interest, wherein the area of expanded interest is not included in the area of user interests, the area of expanded interest based on the selected personalization value, wherein a quantity of items in the area of expanded interest increases and a degree of similarity of the items in the area of expanded interest decreases as the user selection decreases from the maximum personalization value to the minimum personalization value;

combining by the first computer, the first set of recommended items with the second set of items to produce a combined set of recommended and expanded interest items; and presenting by the first computer, the combined set of recommended and expanded interest items to the user, such that the first set of recommended items and the second set of expanded interest items are simultaneously presented to the user.

2. The method of claim 1 wherein combining the first set with the second set further comprises interspersing said first set of items with said second set of items.

3. The method of claim 2 wherein the interspersing is realized through a two-dimensional layout of recommended items with expanded interest items.

4. The method of claim 3 wherein the two-dimensional layout resembles the layout of a printed document.

5. The method of claim 1 wherein the area of expanded interest excludes an area of disinterest.

6. The method of claim 1 wherein a ratio of items from the first set of items to the second set of items is controlled by the selected personalization value.

7. The method of claim 1 wherein the first set of items contains informational content.

8. The method of claim 7 wherein the informational content is in the form of a news story.

9. The method of claim 1 wherein the first set of items contains advertisements.

10. The method of claim 1 wherein the first set of items contains offers for sale.

11. A computer based method for redirecting a recommendation engine, the method comprising:

(a) presenting by a first computer, to a user, a first set of recommended items;

(b) presenting by the first computer, to the user, a second set of expanded interest items and a range of personalization values, the range comprising a minimum personalization value, a maximum personalization value and a plurality of additional values between the minimum and the maximum values, wherein the maximum personalization value corresponds to the first set of recommended items;

(c) receiving by the first computer, user input corresponding to the selection of one or more of the expanded interest items, the expanded interest items based on a degree of personalization;

(d) receiving by the first computer, a user selection of one of the personalization values; and (e) modifying the set of expanded interest items presented to the user based on the user selection of the one or more expanded interest items and the selected personalization value, wherein a quantity of items in the second set of expanded interest items increases and a degree of similarity of the items in the second set of expanded interest items decreases as the user selection decreases from the maximum personalization value to the minimum personalization value.

12. The method of claim 11 wherein the modifying of step (e) is realized through the modification of user preferences.

13. An electronic processing system for generating partially personalized electronic data and outputting the data to a user, the system comprising:

a processing system of one or more processors configured to:

receive a first set of data describing the area of user interests;

receive a first set of recommended items corresponding to the area of user interests;

receive a second set of expanded interest items in an area of expanded interest, wherein the area of expanded interest is not included in the area of user interests, the area of expanded interest based on a degree of personalization;

present to the user a plurality of personalization indicia, the indicia representing a range of personalization values, the range comprising a minimum personalization value, a maximum personalization value and a plurality of additional values between the minimum and the maximum values, wherein the maximum personalization value corresponds to the first set of recommended items;

receive a user selection of one of the personalization indicia, the selected personalization indicia identifying the degree of personalization;

combine the first set of recommended items with the second set of expanded interest items to produce a combined set of recommended and expanded interest items, wherein a quantity of items in the area of expanded interest increases and a degree of similarity of the items in the area of expanded interest decreases as the user selection decreases from the maximum personalization value to the minimum personalization value; and present the combined set of recommended and expanded interest items to the user, such that the first set of recommended items and the second set of expanded interest items are simultaneously presented to the user.

14. The system of claim 13 wherein the combination of the first and second set of items includes interspersing the first set of items with the second set of items.

15. The system of claim 13 wherein the interspersing is realized through the two-dimensional layout of recommended items with expanded interest items.

16. The system of claim 13 wherein the area of expanded interest excludes an area of disinterest.

17. The system of claim 13 wherein the combination of the first and second set of items can be controlled such that a ratio of items from the first set to items from the second set is derived from the selected personalization value.

18. An electronic processing system for redirecting a recommendation engine, the system comprising:

a processing system of one or more processors configured to:

present a user with a first set of recommended items;

present the user with a set of expanded interest items comprising one or more expanded interest items and a range of personalization values, the range comprising a minimum personalization value, a maximum personalization value and a plurality of additional values between the minimum and the maximum values, wherein the maximum personalization value corresponds to the first set of recommended items;

receive user input corresponding to the selection of one or more of the expanded interest items, the expanded interest items selected based on a degree of personalization;

receive user selection of one of the personalization values, the selected personalization value identifying the degree of personalization; and modify the set of expanded interest items presented to the user based on the user's selection of the one or more expanded interest items and the selected personalization value, wherein a quantity of items in the set of expanded interest items increases and a degree of similarity of the items in the set of expanded interest items decreases as the user selection decreases from the maximum personalization value to the minimum personalization value.

19. The system of claim 18 wherein the modification of the set of expanded interest items is realized through the modification of user preferences.

20. An article of manufacture for generating a partially personalized electronic data output containing a combination of recommended and expanded interest items for a user, the article of manufacture comprising a non-transitory computer-readable storage medium storing computer-executable instructions for performing a method comprising:

receiving, using a processing system, a first set of data describing the area of user interests;

receiving, using the processing system, a first set of recommended items corresponding to the area of user interests;

receiving, using the processing system, a second set of expanded interest items in an area of expanded interest, wherein the area of expanded interest is not included in the area of user interests, the area of expanded interest based on a degree of personalization;

presenting, using the processing system, to the user a range of personalization values, the range comprising a minimum personalization value, a maximum personalization value and a plurality of additional values between the minimum and the maximum values;

receiving, using the processing system, a user selection of one of the personalization values, the selected personalization value identifying the degree of personalization;

combining, using the processing system, the first set of items with the second set of items to produce a combined set of recommended and expanded interest items; and presenting, using the processing system, the combined set of recommended and expanded interest items to the user, such that the first set of recommended items and the second set of expanded interest items are simultaneously presented to the user, wherein a quantity of items in the area of expanded interest increases and a degree of similarity of the items in the area of expanded interest decreases as the user selection decreases from the maximum personalization value to the minimum personalization value.

21. The article of manufacture of claim 20, wherein combining the first set of items with the second set of items further comprises interspersing said first set of items with said second set of items.

22. The article of manufacture of claim 20, wherein the interspersing is realized through the two-dimensional layout of recommended items with expanded interest items.

23. The article of manufacture of claim 20, wherein the area of expanded interest excludes an area of disinterest.

24. The article of manufacture of claim 20, wherein a ratio of items from the first set of items to the second set is controlled by the selected personalization value.

25. An article of manufacture for performing a method for redirecting a recommendation engine, the article of manufacture comprising a non-transitory computer-readable storage medium storing computer-executable instructions for performing a method comprising:

(a) presenting, using a processing system, to a user, a first set of recommended items;

(b) presenting, using the processing system, to the user, a second set of expanded interest items and a range of personalization values, the range comprising a minimum personalization value, a maximum personalization value and a plurality of additional values between the minimum and the maximum values, wherein the maximum personalization value corresponds to the first set of recommended items;

(c) receiving, using the processing system, user input corresponding to the selection of one or more of the expanded interest items, the expanded interest items based on a degree of personalization;

(d) receiving, using the processing system, a user selection of one of the personalization values, the selected personalization value identifying the degree of personalization; and (e) modifying, using the processing system, the set of expanded interest items based on the user selection of the one or more expanded interest items and the selected personalization value, wherein a quantity of items in the area of expanded interest increases and a degree of similarity of the items in the area of expanded interest decreases as the user selection decreases from the maximum personalization value to the minimum personalization value.

26. The article of manufacture of claim 25 wherein the computer-executable instructions performing the method step of modifying the set of expanded interest items is realized through the modification of user preferences.

27. An electronic processing system for generating partially personalized electronic data and outputting the data to a user, the system comprising:

(a) a memory configured to store a first electronic inventory containing items for display, and a second electronic inventory containing user information; and (b) a processor configured to implement a recommendation engine for selecting a first set of items from the first electronic inventory corresponding to the second electronic inventory, a query engine for presenting to the user, a range of personalization values, the range comprising a minimum personalization value, a maximum personalization value and a plurality of additional values between the minimum and the maximum values, wherein the maximum personalization value corresponds to the first set of recommended items, a response engine for receiving a user selection of one of the personalization values, an expanded interest recommendation engine for selecting a second set of items, not contained in the first set of items, from the first electronic inventory, the second set of items based on the selected personalization value, wherein a quantity of items in the area of expanded interest increases and a degree of similarity of the items in the area of expanded interest decreases as the user selection decreases from the maximum personalization value to the minimum personalization value, and an output engine for combining and displaying at least some subset of the first set of items with at least some subset of the second set of items.

28. The electronic processing system of claim 27, wherein the first electronic inventory represents an area of user interest.

29. The electronic processing system of claim 27 further comprising an area of disinterest from which no items for display are selected.

30. The electronic processing system of claim 28, wherein the recommendation engine intersperses items from the first set of items and the second set of items.

31. The electronic processing system of claim 27, wherein the interspersing is realized through a two dimensional layout.

* * * * *